US011336387B2

United States Patent
Igura et al.

(10) Patent No.: US 11,336,387 B2
(45) Date of Patent: May 17, 2022

(54) WIRELESS COMMUNICATION APPARATUS, DATA RECEPTION METHOD, AND PROGRAM

(71) Applicants: NEC CORPORATION, Tokyo (JP); CENTRAL JAPAN RAILWAY COMPANY, Nagoya (JP)

(72) Inventors: Hiroyuki Igura, Tokyo (JP); Takeshi Nishiyama, Aichi (JP); Yoshihiro Matsumura, Aichi (JP)

(73) Assignees: NEC CORPORATION, Tokyo (JP); CENTRAL JAPAN RAILWAY COMPANY, Nagoya (JP)

( * ) Notice: Subject to any disclaimer, the term of this patent is extended or adjusted under 35 U.S.C. 154(b) by 0 days.

(21) Appl. No.: 16/981,965

(22) PCT Filed: Mar. 26, 2019

(86) PCT No.: PCT/JP2019/012760
§ 371 (c)(1),
(2) Date: Sep. 17, 2020

(87) PCT Pub. No.: WO2019/189119
PCT Pub. Date: Oct. 3, 2019

(65) Prior Publication Data
US 2021/0099246 A1  Apr. 1, 2021

(30) Foreign Application Priority Data
Mar. 27, 2018  (JP) .............................. JP2018-060462

(51) Int. Cl.
*H04L 1/00* (2006.01)
*H04L 27/26* (2006.01)

(52) U.S. Cl.
CPC .......... *H04L 1/0003* (2013.01); *H04L 1/0045* (2013.01); *H04L 27/2602* (2013.01)

(58) Field of Classification Search
CPC .. H04L 1/0003; H04L 1/0045; H04L 27/2602
See application file for complete search history.

(56) References Cited

U.S. PATENT DOCUMENTS

| 6,788,932 B2 | 9/2004 | Nakamichi |
| 7,046,975 B2 | 5/2006 | Golitschek Edler Von Elbwart et al. |

(Continued)

FOREIGN PATENT DOCUMENTS

| JP | 01-181250 A | 7/1989 |
| JP | 2002-27537 A | 1/2002 |

(Continued)

OTHER PUBLICATIONS

International Search Report for PCT/JP2019/012760 dated Apr. 23, 2019 [PCT/ISA/210].

(Continued)

*Primary Examiner* — Janice N Tieu
(74) *Attorney, Agent, or Firm* — Sughrue Mion, PLLC

(57) ABSTRACT

Provided is a wireless communication apparatus, comprising: a symbol synthesis circuit that synthesizes received symbols; a demodulation circuit that demodulates the received symbols each before and after the synthesis; an error correction circuit that corrects demodulated received data from the demodulation circuit; a detection circuit that detects a first error detection code from the error corrected received data; a second detection circuit that detects a second error detection code obtained by inverting a plurality of arbitrary bits from the error corrected received data; a received data selection circuit that selects the received data, wherein: the received data selection circuit determines a modulation scheme used upon transmission by using detec- (Continued)

tion results of the first and second error detection codes and selects received data corresponding to the determined modulation scheme.

19 Claims, 24 Drawing Sheets

(56) References Cited

U.S. PATENT DOCUMENTS

| | | | |
|---|---|---|---|
| 7,680,207 | B2 | 3/2010 | Moon et al. |
| 9,667,361 | B2 | 5/2017 | Nagata et al. |
| 10,050,745 | B2 | 8/2018 | Suda |
| 10,136,451 | B2 | 11/2018 | Nagata et al. |
| 10,206,202 | B2 | 2/2019 | Imamura et al. |
| 2002/0004388 | A1 | 1/2002 | Nakamichi |
| 2003/0166395 | A1* | 9/2003 | Golitschek ............ H04L 27/34 455/130 |
| 2004/0121788 | A1 | 6/2004 | Moon et al. |
| 2005/0053038 | A1* | 3/2005 | Kimura ............... H04L 1/0034 370/333 |
| 2006/0280204 | A1 | 12/2006 | Nagata et al. |
| 2008/0288852 | A1* | 11/2008 | Uehara ................ H04L 5/0046 714/786 |
| 2009/0141836 | A1* | 6/2009 | Shirakata ........... H04L 27/2679 375/343 |
| 2011/0122959 | A1* | 5/2011 | Matsuoka ........... H04L 27/2649 375/260 |
| 2012/0207054 | A1* | 8/2012 | Okubo ................. H04L 1/1671 370/252 |
| 2012/0320858 | A1 | 12/2012 | Maru |
| 2014/0376479 | A1 | 12/2014 | Imamura et al. |
| 2015/0365181 | A1 | 12/2015 | Nagata et al. |
| 2017/0005756 | A1 | 1/2017 | Suda |
| 2017/0231000 | A1 | 8/2017 | Nagata et al. |

FOREIGN PATENT DOCUMENTS

| | | |
|---|---|---|
| JP | 2002-199033 A | 7/2002 |
| JP | 2004-048637 A | 2/2004 |
| JP | 2004-179679 A | 6/2004 |
| JP | 3665315 B2 | 6/2005 |
| JP | 3883562 B2 | 2/2007 |
| JP | 2009-033315 A | 2/2009 |
| JP | 4783217 B2 | 9/2011 |
| JP | 2013-157696 A | 8/2013 |
| JP | 5704160 B2 | 4/2015 |
| WO | 2014/119413 A1 | 8/2014 |
| WO | 2015/145592 A1 | 10/2015 |

OTHER PUBLICATIONS

Written Opinion for PCT/JP2019/012760 dated Apr. 23, 2019 [PCT/ISA/237].

* cited by examiner

WIRELESS COMMUNICATION APPARATUS, DATA RECEPTION METHOD, AND PROGRAM

REFERENCE TO RELATED APPLICATION

This application is a National Stage of International Application No. PCT/JP2019/012760 filed Mar. 26, 2019, claiming priority based upon and claims the benefit of the priority of Japanese patent application No. 2018-060462 filed on Mar. 27, 2018, the disclosure of which is incorporated herein in its entirety by reference thereto.

FIELD

The present invention relates to a wireless communication apparatus, data receiving method, and program.

BACKGROUND

In wireless communication, a bit error incidence greatly varies depending on the line quality of the wireless propagation path. The line quality of the wireless propagation path dynamically changes in a mobile wireless communication due to a change in a relative position between transmitting and receiving apparatuses, in addition to a change in the propagation path itself due to a change in weather, surrounding structures, and the like.

In general, the transmission capacity and the bit error incidence is in a trade-off relationship. If a modulation scheme with a large transmission capacity is used, bit error incidence is high, and conversely, if a modulation scheme of low bit error incidence is used, transmission capacity decreases.

Therefore, if the modulation scheme is fixed so that the bit error falls within a certain range when the line quality of the wireless line is degraded, the transmission capacity is fixed low even when the line quality of the wireless line is good. As a result, the use efficiency of radio wave resources is reduced.

Therefore, in recent wireless communication devices, adaptive modulation has been employed, in which line quality of the wireless propagation path is captured, and when the line quality of the wireless propagation path is good, a modulation scheme with a large transmission capacity is used, whereas when the line quality of the wireless propagation path is degraded, a bit error rate is reduced by using a modulation scheme with a small capacity.

As an example of switching of the modulation scheme by the adaptive modulation, a method of switching the primary modulation scheme such as BPSK, QPSK, 16 QAM, and 64 QAM is often used. Here, BPSK, QPSK, and QAM are abbreviations of Binary Phase Shift Keying, Quadrature Phase Shift Keying, and Quadrature Amplitude Modulation, respectively.

For example, in FIG. 5 of Patent Literature 1, four primary modulation schemes of BPSK, QPSK, 16 QAM, and 64 QAM are switched according to the line quality. When the line quality is inferior, bit error is reduced by using a primary modulation scheme having a low modulation grade such as BPSK.

As another method of switching the modulation scheme by the adaptive modulation, a method of changing a code rate in error correction is often used. For example, in Patent Literature 2, not only the primary modulation scheme but also the code rate in error correction is changed by the adaptive modulation.

As another high gain modulation scheme, there is a method using direct spreading together. For example, the background art section of Patent Literature 3 describes that a processing gain can be obtained in a code division multiplex transmission system including direct spreading. However, by performing direct spreading, the number of symbols to be transmitted increases. For example, to obtain a gain of 3 dB, the number of symbols is doubled, and to obtain a gain of 6 dB, the number of symbols is quadrupled, resulting in decrease of the transmission speed.

As a further high-gain modulation scheme, there is a method of repeatedly transmitting the same data and averaging the data to increase the gain. For example, Patent Literature 10 describes a method of repeatedly transmitting the same data, averaging the same by an averaging processing circuit, and increasing the gain. In this case as also, the transmission speed decreases as the number of times of averaging increases, as described above.

By the way, in adaptive modulation, since the modulation scheme of a radio wave changes dynamically, it is necessary for the wireless communication apparatus on the receiving side to know the modulation scheme of the radio wave transmitted by the wireless communication apparatus on the transmission side.

As a general method for grasping the modulation scheme in the wireless communication apparatus on the receiving side, there is known a method of performing communication using a format in which a control signal having a fixed modulation scheme and a main signal whose modulation scheme changes are mixed. In this method, a modulation scheme of a main signal whose modulation scheme changes is notified to a wireless apparatus on the receiving side by using a control signal whose modulation scheme is fixed.

Usually, in the method of notifying the modulation scheme using the control signal, if there is a bit error in the control signal, all the main signals become also erroneous. Thus the control signal is modulated by using a modulation scheme and a coding rate which have a low error rate.

For example, in Patent Literature 4, there is a disclosure of a scheme, in which so called MCS table containing information such as the modulation scheme and the like, which is held in the transmitting and receiving wireless communication apparatuses, and the modulation scheme used in the transmitting wireless communication apparatus is stored in the MCS table, followed by notifying the modulation scheme used by the wireless communication apparatus and the transmission side by way of an index number to a wireless communication apparatus on the receiving side by using a PDCCH that is a control signal having a fixed modulation scheme.

As a method for grasping other modulation scheme(s), there is a method using blind modulation. In the blind modulation, a possible modulation scheme is tried in order by one to another, and whether or not demodulation has been correctly performed is detected by using an error detection means such as a CRC, and a modulation scheme in which no error is detected is determined to be a correct modulation scheme. Here, CRC is an abbreviation of Cyclic Redundancy Check.

For example, in FIG. 7 of Patent Literature 5, a technique is disclosed in which the interpretation device 22 demodulates using a possible modulation scheme, corrects error using an FEC decoder 23, detects error using a CRC detector 24, and these processes are repeated until no error is detected. Similarly, Patent Literature 9 discloses a technique of switching either the primary modulation scheme of 64

QAM or 16 QAM according to the line quality and selecting the correct primary modulation scheme according to the CRC detection result.

[Patent Literature 1] Japanese Patent Kokai Publication No. JP2002-199033A
[Patent Literature 2] Japanese Patent No. 5704160B
[Patent Literature 3] Japanese Patent No. 4783217B
[Patent Literature 4] International Publication WO2014/119413A
[Patent Literature 5] Japanese Patent No. 3665315B
[Patent Literature 6] Japanese Patent No. 3883562B
[Patent Literature 7] Japanese Patent Kokai Publication No. JP2002-27537A
[Patent Literature 8] International Publication WO2015/145592A
[Patent Literature 9] Japanese Patent Kokai Publication No. JP2009-33315A
[Patent Literature 10] Japanese Patent Kokai Publication No. JP-H01-181250A

SUMMARY

The following analysis is given by the present invention. The adaptive modulation schemes mentioned above have a problem that communication cannot be performed when the line quality is significantly degraded. For example, in the technique disclosed in Patent Literature 4 in which a modulation scheme is notified by using a control signal having a fixed modulation scheme, a primary modulation scheme having a low modulation factor, such as BPSK or QPSK, or an error correction scheme with a low code rate such as ⅓ is used as a control signal modulation scheme. However, if the line quality degrades to an extent that the bit error does not fall within a specified range even when such a modulation scheme is used, communication cannot be performed.

In this case, the gain of the control signal is always increased by using a modulation scheme such as direct spreading described in Patent Literature 3 or a modulation scheme repeatedly transmitted as described in Patent Literature 10, whereby it is possible to keep the bit error of the control signal within a specified range. However, if the gain of the control signal is always increased, the number of symbols required for the control signal is greatly increased, and there is a problem that the transmission speed is reduced even when the line quality is good.

Further, in the method using blind modulation as disclosed in Patent Literature 5, the main signal is demodulated in order by one to another while switching the modulation scheme, and an error is detected for each modulation scheme using error detection means such as CRC. Therefore, there is a problem that amount of processing is increased. Also there is another problem that when demodulation is performed using a modulation scheme other than the used modulation scheme, an appropriate modulation scheme cannot be selected unless an error detection scheme that can reliably detect error is used.

Further, the technique of performing the thinning processing as in Patent Literature 9 is effective only within modulation schemes using a gray code having a high degree of modulation schemes, such as 64 QAM and 16 QAM. And it cannot be used for the case when the line quality is so degraded that the bit error extent the specified range even if the modulation scheme such as BPSK and QPSK be used.

It is an object of the present invention to provide a technique that contributes to enrichment of switching scheme for switching to a high-gain modulation scheme of a control signal, which enables communication even when the line quality is significantly degraded, and does not affect the transmission speed when the line quality is good.

According to a first aspect of the invention, this object is achieved by a wireless communication apparatus, comprising a symbol synthesis circuit that synthesizes received symbols; a demodulation circuit that demodulates the received symbols each before and after the synthesis; an error correction circuit that corrects demodulated received data from the demodulation circuit; a detection circuit that detects a first error detection code from the error corrected received data; a second detection circuit that detects a second error detection code obtained by inverting a plurality of arbitrary bits from the error corrected received data; and a received data selection circuit that selects the received data, wherein, the received data selection circuit determines a modulation scheme used upon transmission by using detection results of the first and second error detection codes and selects received data corresponding to the determined modulation scheme.

According to a second aspect of the invention, this object is achieved by a data receiving method wherein in a wireless communication apparatus comprising: a symbol synthesis circuit that synthesizes received symbols; a demodulation circuit that demodulates the received symbols each before and after the synthesis; an error correction circuit that corrects demodulated received data from the demodulation circuit a detection circuit that detects a first error detection code from the error corrected received data; a second detection circuit that detects a second error detection code obtained by inverting a plurality of arbitrary bits from the error corrected received data; and a received data selection circuit that selects the received data, the method comprises: determining a modulation scheme used upon transmission by using the detection results of the first error detection code and the second error detection code, and selecting received data corresponding to the detected modulation scheme.

According to a third aspect of the invention, this object is achieved by a program for a computer loaded in a wireless communication apparatus, wherein in a wireless communication apparatus comprising: a demodulation circuit that demodulates the received symbols each before and after the synthesis; an error correction circuit that corrects demodulated received data from the demodulation circuit; a detection circuit that detects a first error detection code from the error corrected received data; a second detection circuit that detects a second error detection code obtained by inverting a plurality of arbitrary bits from the error corrected received data; and a received data selection circuit that selects the received data, wherein the program causes the computer to perform; a processing of detecting a modulation scheme used in transmission by using the detection results of the first error detection code and the second error detection code, and a processing of selecting received data corresponding to the determined modulation scheme.

This program can be stored on a computer-readable (non-transitory) storage medium. That is, the present invention can be embodied as a computer program product. The program can be input to the computer device via an input device or an external device via a communication interface, stored in a storage device, and drive the processor according to predetermined steps or processing. In addition, the program can display the processing result including the intermediate state as necessary through the display device for each stage, or can communicate with the outside via the communication interface. The computer device for that purpose includes, as an example, a processor, a storage device, an input device, a communication interface, and a display device as needed, which are typically connectable to each other by a bus.

According to the present invention, it can provide a switching scheme for switching the control signal to a high gain modulation scheme, in which it is possible to perform communication even when the line quality is significantly degraded, without affecting the transmission speed when the line quality is good. That is, the present invention converts the wireless communication device described in the background art into an apparatus capable of selecting received data according to the line quality.

PREFERRED MODES

Figure 1:
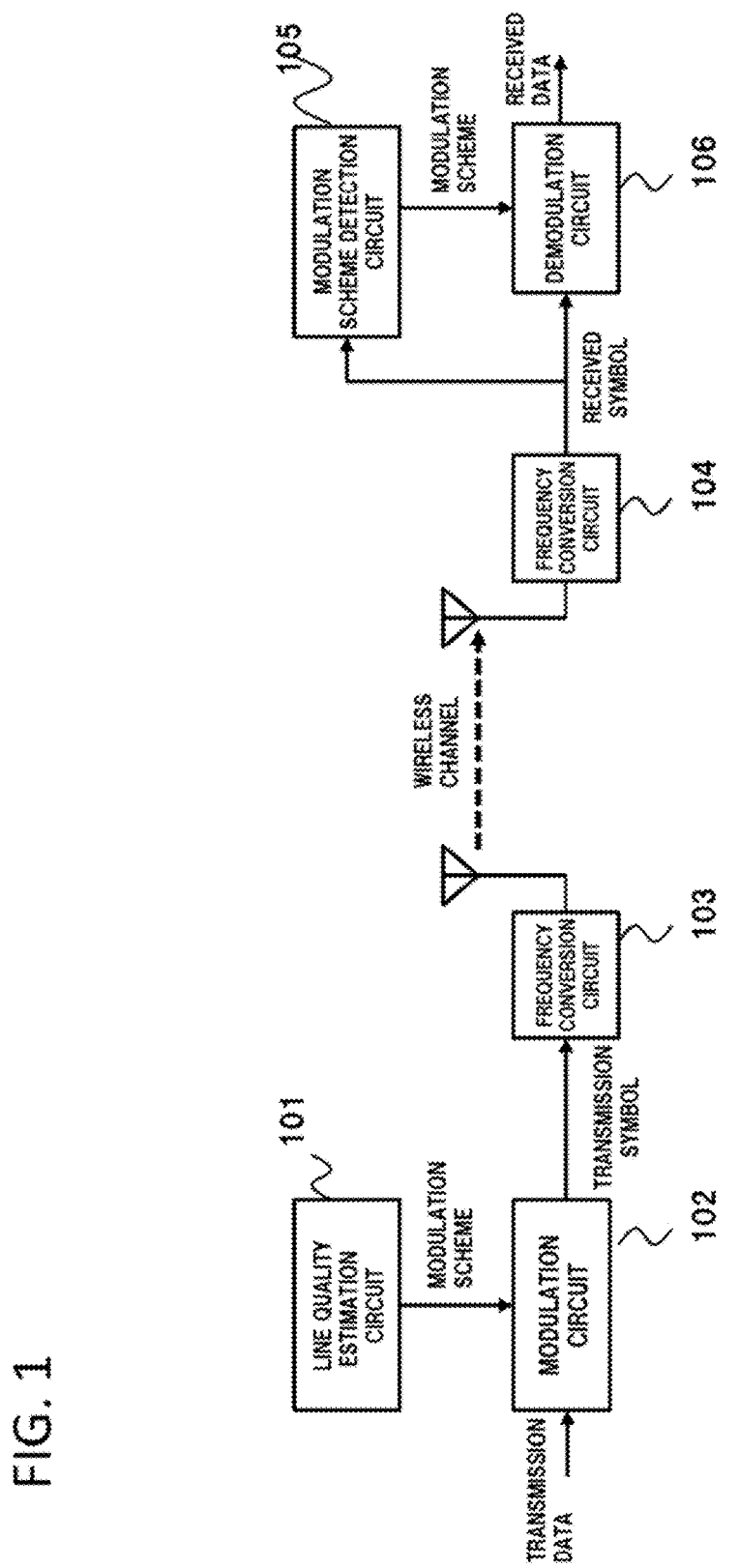
FIG. 1 is a block diagram illustrating a signal flow between the wireless apparatuses according to a first exemplary embodiment of the present invention.

First, an outline of an exemplary embodiment of the present invention will be described with reference to the drawings. It should be noted that the reference signs in the drawings attached to this outline are added to each element for convenience as an example to facilitate understanding, and are not intended to limit the present invention to the illustrated modes. Further, connection lines between blocks in the drawings and the like referred to in the following description include both bidirectional and unidirectional. The one-way arrow schematically indicates the flow of a main signal (data), and does not exclude bidirectionality. Ports and interfaces are provided at input and output connection points of each block in the figure, but are not shown. The program is executed via a computer device, and the computer device includes, for example, a processor, a storage device, an input device, a communication interface, and a display device as necessary. Further, the computer device is configured to be able to communicate with a device inside or outside the device (including a computer) via a communication interface regardless of whether it is wired or wireless.

Figure 24:
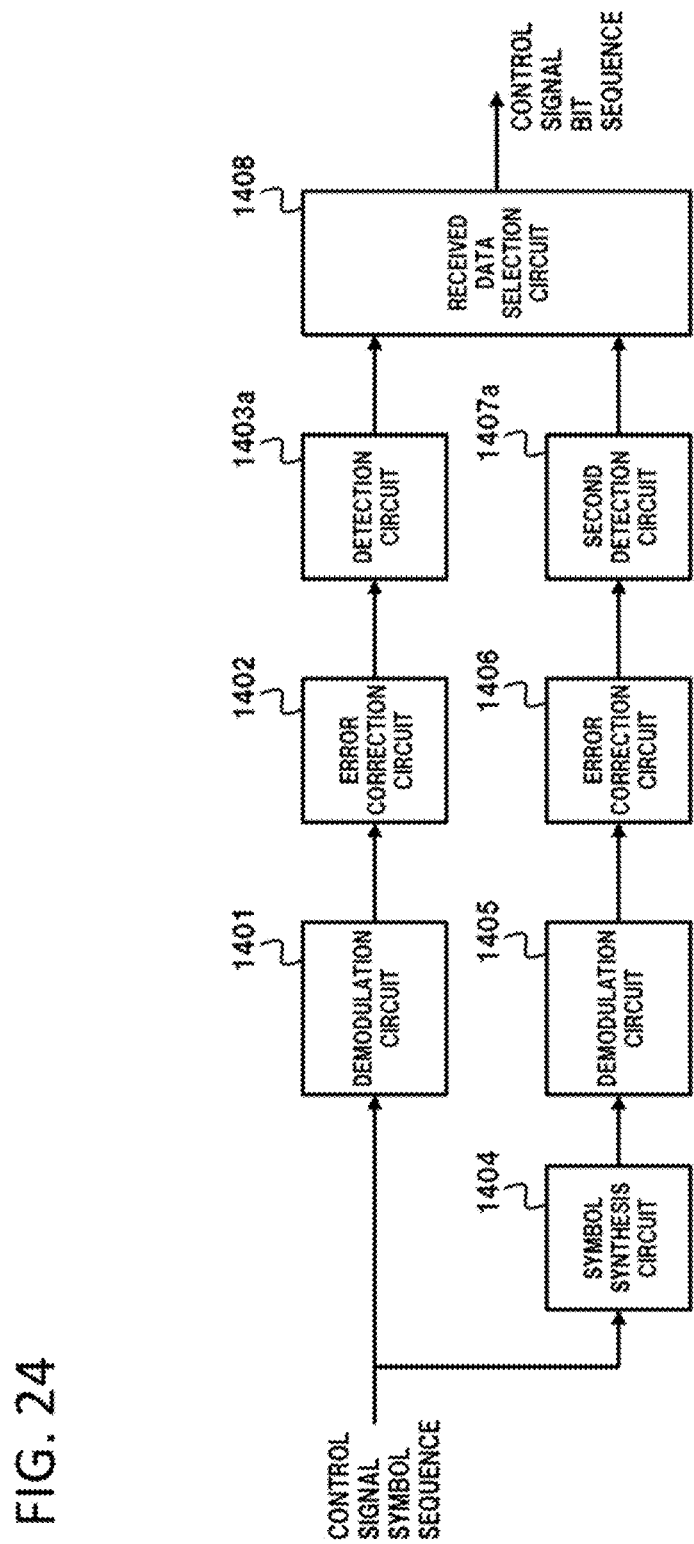
FIG. 24 is a diagram showing a structure of an exemplary embodiment of the present invention.

On one exemplary embodiment of the present invention, as shown in FIG. 24, a symbol synthesis circuit 1404, demodulation circuits 1401 and 1405, error correction circuits 1402 and 1406, a detection circuit 1403a, a second detection circuit 1407a and a received data selection circuit 1408 are provided.

Specifically, symbol synthesis circuit 1404 synthesizes received symbols. Demodulation circuits 1401 and 1405 demodulate received symbols before and after synthesis, respectively. The error correction circuits 1402 and 1406 correct errors in the demodulated received data output from the demodulation circuits 1401 and 1405, respectively. The detection circuit 1403a detects a first error detection code from the error-corrected received data. The second detection circuit 1407a detects a second error detection code from the error-corrected received data obtained by inverting a plurality of arbitrary bits. Then, the received data selection circuit 1408 determines the modulation scheme used at the time of transmission using the detection results of the first and second error detection codes, and selects reception data corresponding to the determined modulation scheme.

With the above configuration, it is possible to perform communication even when the line quality is significantly degraded, and to switch the control signal to a high gain modulation scheme that does not affect the transmission speed when the line quality is good. The reason is that the received data selection circuit 1408 determines whether or not the line quality is degraded in accordance with the detection results of the first and second error detection codes, and selects the received data.

First Exemplary Embodiment of the Present Invention

Subsequently, a first exemplary embodiment of the present invention will be described in detail with reference to the drawings. FIG. 1 shows a signal flow between wireless communication devices when adaptive modulation is used in the first exemplary embodiment of the present invention.

First, in a wireless apparatus on the transmitting side, the line quality of the wireless channel is estimated by a line quality estimation circuit 101, and the modulation scheme is determined according to the estimation result. Next, the transmission data is encoded and modulated using a modulation circuit 102 using the modulation scheme determined by the line quality estimation circuit 101 to generate a transmission symbol.

The generated transmission symbol is converted into an RF signal by a frequency conversion circuit 103 and transmitted through the transmission antenna.

The transmitted RF signal reaches the wireless apparatus on the receiving side through a wireless propagation path, passes through a receiving antenna, and is frequency-converted by the frequency conversion circuit 104 to become a received symbol.

A modulation scheme determination circuit 105 determines the modulation scheme using the received symbols, and uses the modulation scheme to demodulate and decode the received symbols in a demodulation circuit 106 to generate received data.

Figure 2:
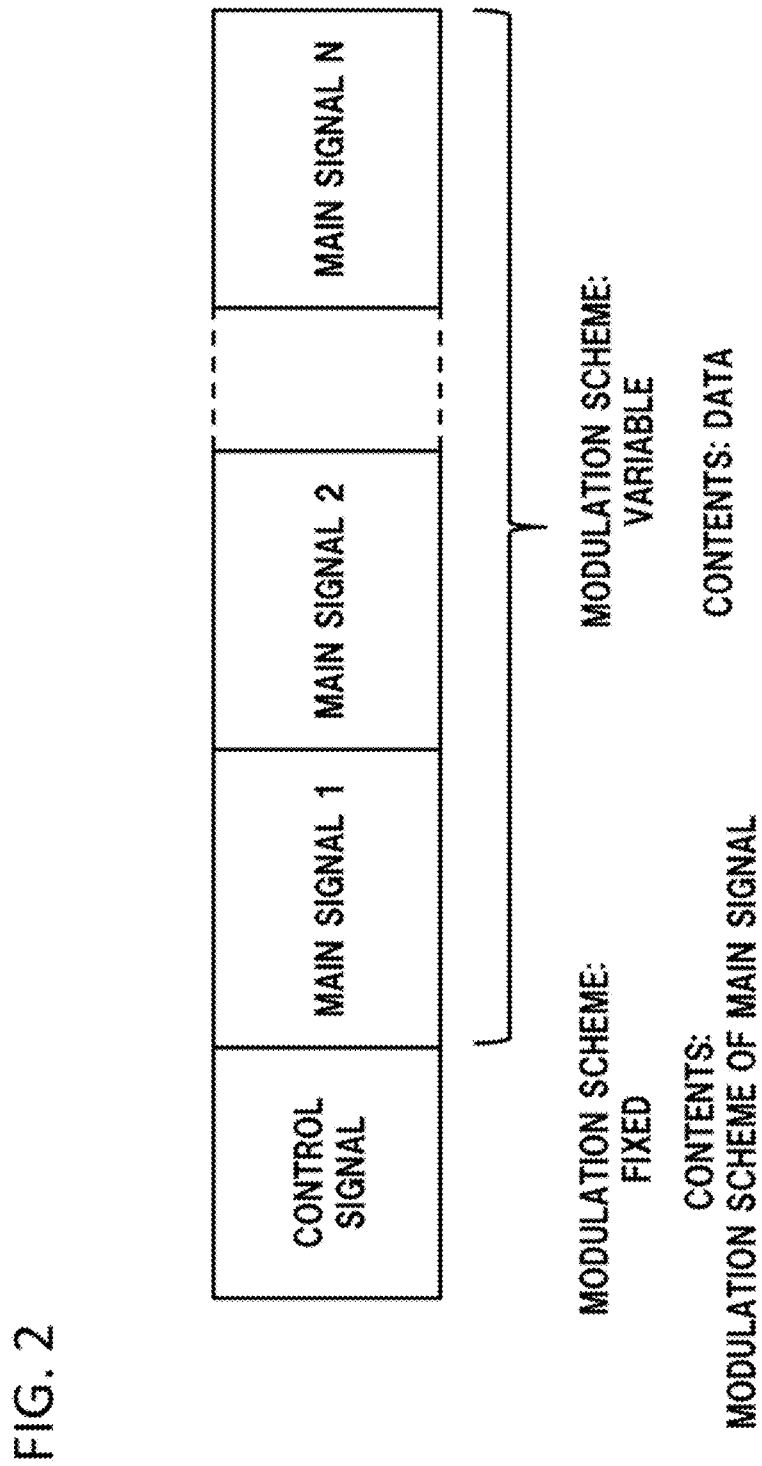
FIG. 2 is a diagram showing a slot structure of a received data in a first exemplary embodiment of the present invention.

FIG. 2 shows a slot configuration of received data in the present exemplary embodiment. The control signal is storing data indicating the modulation scheme of the main signal. The receiving-side wireless communication apparatus first demodulates the received symbol of the control signal and obtains the modulation scheme of the main signal, so that the main signal for which modulation scheme is variable, following the control signal can be demodulated.

Figure 3:
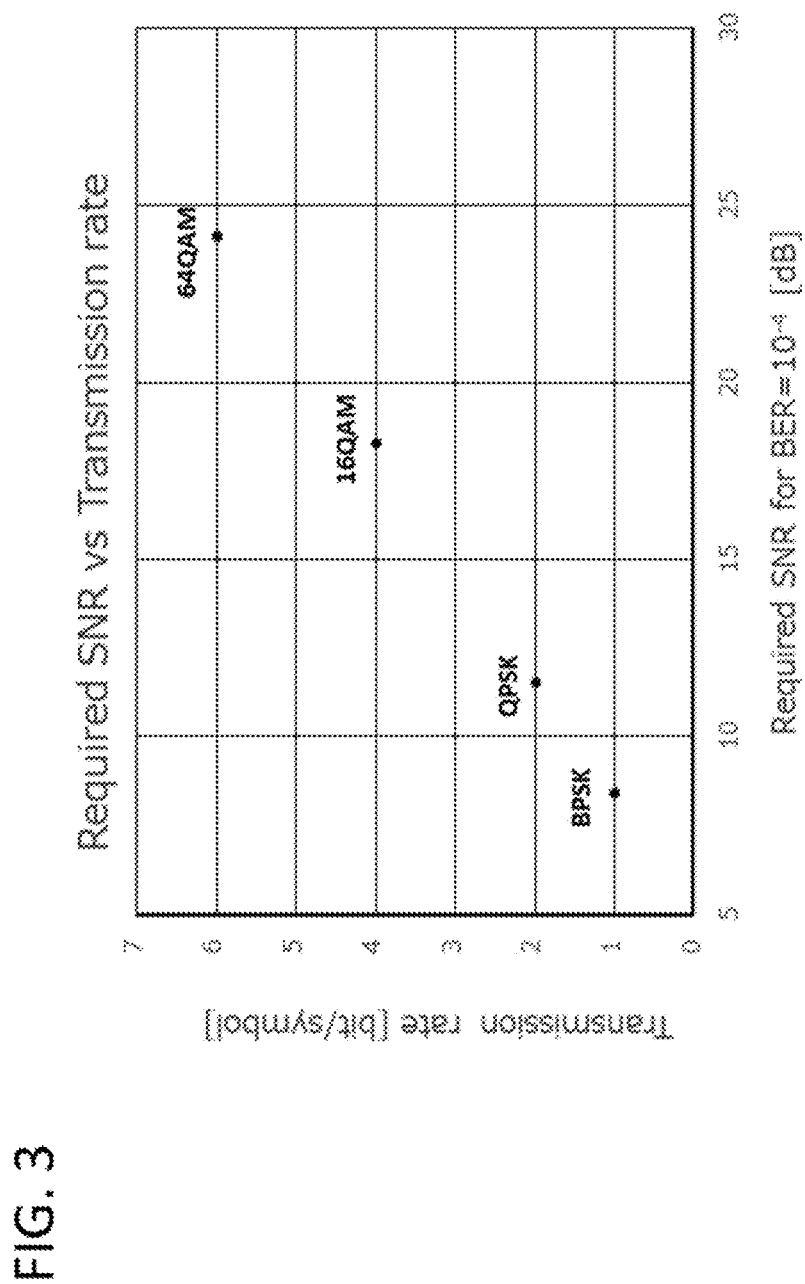
FIG. 3 is a diagram illustrating a relationship between a required S/N ratio and a transmission speed for achieving a bit error rate of 10 to the power of minus 4 ($10^{-4}$) or less in a typical modulation scheme.

FIG. 3 shows a relationship between a required S/N ratio (SNR) and a transmission speed (rate) for realizing a bit error rate of $10^{-4}$ or less in a typical modulation scheme. Generally, the higher the transmission rate, the higher the required S/N ratio. The bit error rate $10^{-4}$ indicates $1 \times 10^{-4}$, that is, a state in which there is one bit error for every 10,000 bits.

For example, in a line in which the S/N ratio of the wireless channel is higher than the required S/N ratio of BPSK and the S/N ratio of the wireless line is lower than the required S/N ratio of QPSK, the bit error rate is $10^{-4}$ or less by using BPSK as the modulation scheme of the main signal. Similarly, on a line in which the S/N ratio of the wireless channel is higher than the required SN ratio of QPSK and the S/N ratio of the wireless line is lower than the required S/N ratio of 16 QAM, the bit error rate of $10^{-4}$ is achieved by using QPSK as the modulation scheme of the main signal. As described above, the modulation scheme of the main signal is switched according to the S/N ratio of the wireless channel.

Since the control signal stores data indicating the modulation scheme of the main signal, a primary modulation scheme such as BPSK having a low required S/N ratio is usually used.

However, when the line quality of the wireless link is significantly degraded and the S/N ratio of the wireless link falls below the required S/N ratio of BPSK, bit errors in the control signal frequently appear, making it difficult to demodulate the received symbols.

In the present exemplary embodiment, when the line quality of the wireless line is significantly degraded, the control signal and the main signal are repeatedly transmitted, and the symbols of the repeatedly transmitted control signal and the main signal are averaged (symbol synthesizing) on the receiving side, which improves the gain and enables demodulation.

Figure 4:
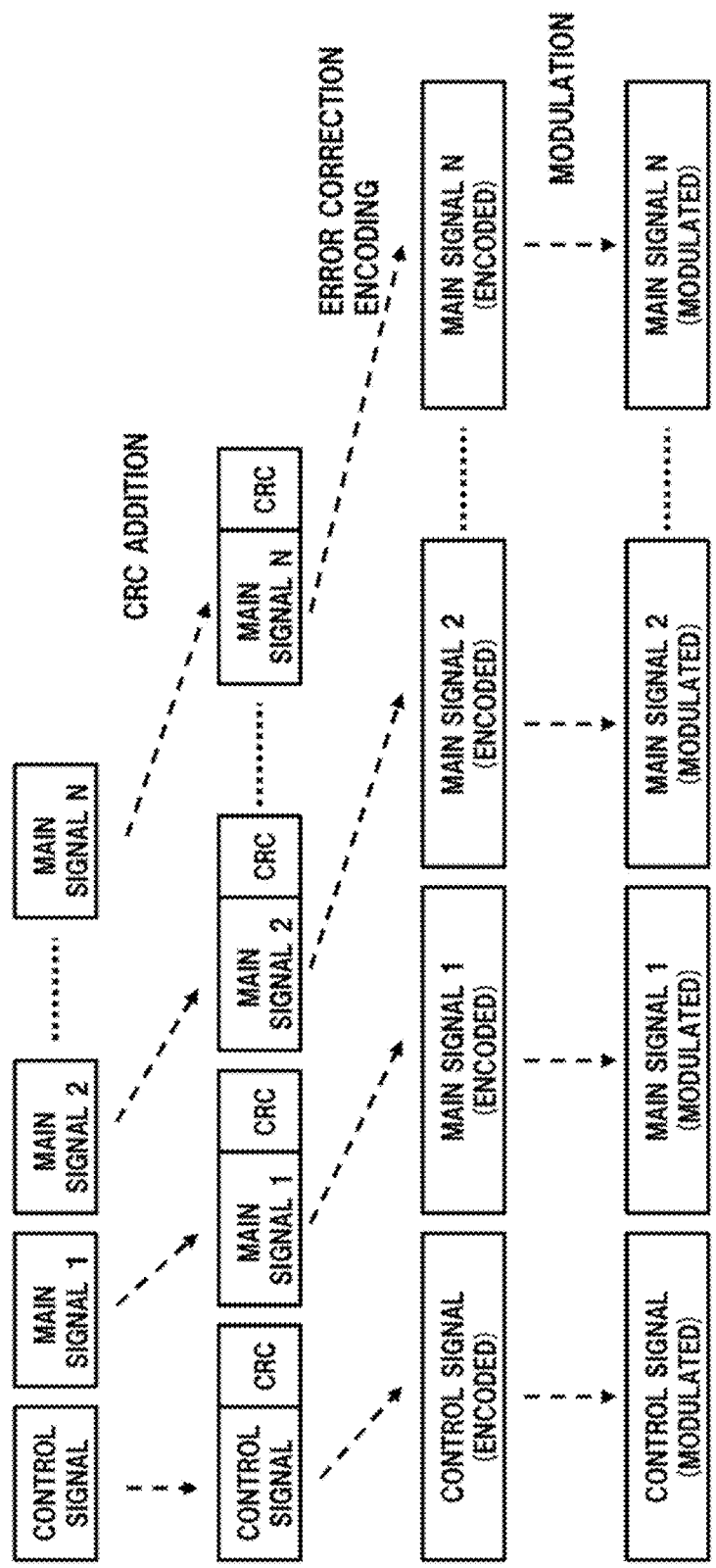
FIG. 4 is a diagram showing flows of control signal, main signal encoding, and modulation processing in a normal state in the first exemplary embodiment of the present invention.

FIG. 4 shows the flow of the control signal and main signal coding and modulation processing in a normal state (time). First, the modulation circuit 102 on the transmission side adds an error detection code (CRC) to the control signal bit sequence and the plurality of main signal bit sequences (CRC addition in FIG. 4).

Next, the modulation circuit 102 on the transmission side encodes the control signal bit sequence and the main signal bit sequence, to which the error detection code is added, with the error correction code (the error correction encoding in FIG. 4).

Finally, the modulation circuit 102 on the transmission side modulates the encoded control signal bit sequence and main signal bit sequence to generate a control signal symbol sequence and a main signal symbol sequence (modulation in FIG. 4).

Parameters such as the modulation scheme of the main signal and the code rate of the error correction code are stored in the control signal. Parameters such as the modulation scheme of the control signal and the code rate of the error correction code are fixedly set (see FIG. 2).

Figure 5:
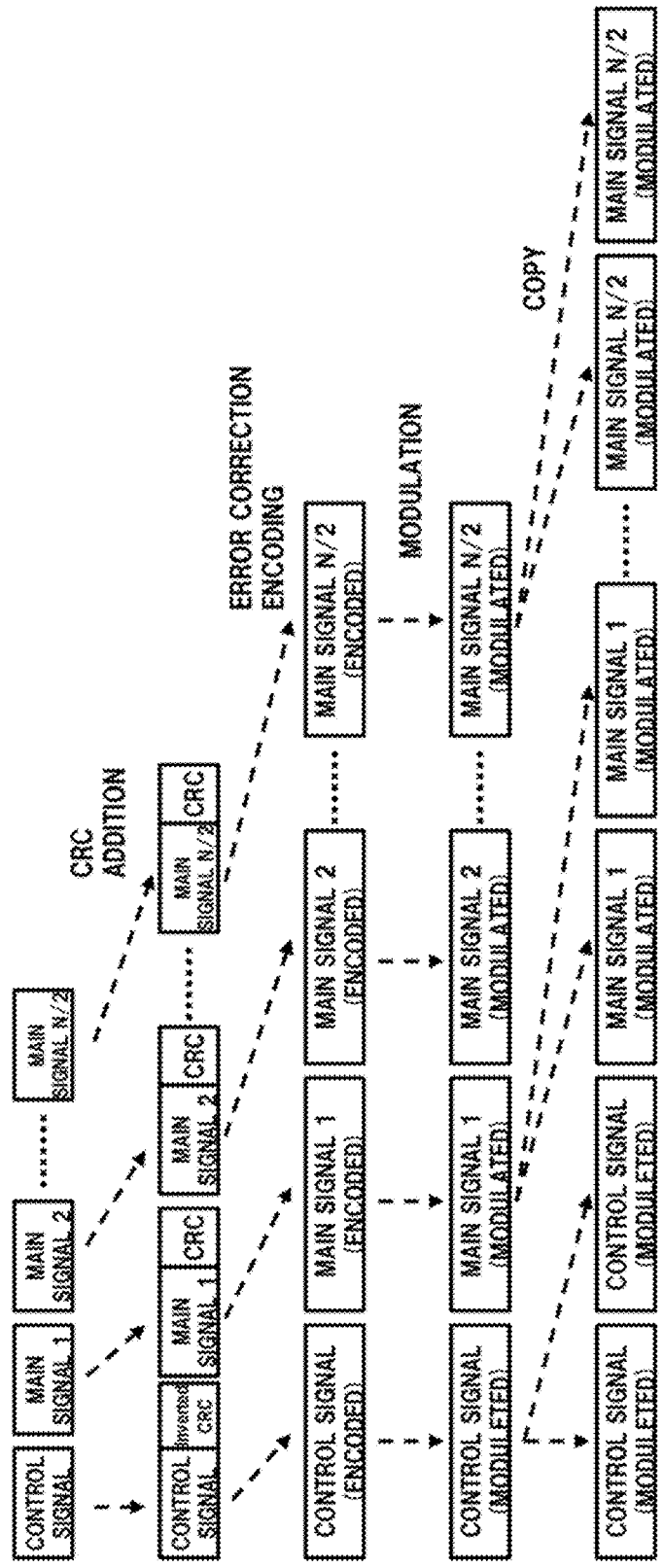
FIG. 5 is a diagram illustrating a flow of a control signal, a main signal encoding, and a modulation process, when the line quality of a wireless line is significantly degraded in the first exemplary embodiment of the present invention.

FIG. 5 shows the flow of encoding and modulation processing of a control signal and a main signal when the line quality of a wireless line is significantly degraded. In this example, the number of repetitions is two.

First, the modulation circuit 102 on the transmission side adds an error detection code (CRC) to a plurality of main signal bit sequences, and adds a code obtained by inverting the error detection code (inverted CRC) to a control signal bit sequence (FIG. 5 CRC Addition).

Next, the modulation circuit 102 on the transmission side encodes the control signal bit sequence and the main signal bit sequence, to which the error detection code or the code obtained by bit-inverting the error detection code is added, with the error correction code (the error correction encoding in FIG. 5).

Next, the modulation circuit 102 on the transmission side modulates the encoded control signal and main signal to generate a control signal symbol sequence and a main signal symbol sequence (modulation in FIG. 5).

Finally, the modulation circuit 102 on the transmission side copies the control signal symbol sequence and the main signal symbol sequence to duplicate them (copy in FIG. 5). In the case of FIG. 5 as well, parameters such as the modulation scheme of the main signal and the code rate of the error correction code are stored in the control signal. Similarly, parameters such as the modulation scheme of the control signal and the code rate of the error correction code are fixedly set to the same values as those stored in the control signal in the normal state.

The number of repetitions of the control signal and the main signal can be set to an arbitrary number. A higher gain can be obtained by increasing the number of repetitions.

Figure 6:
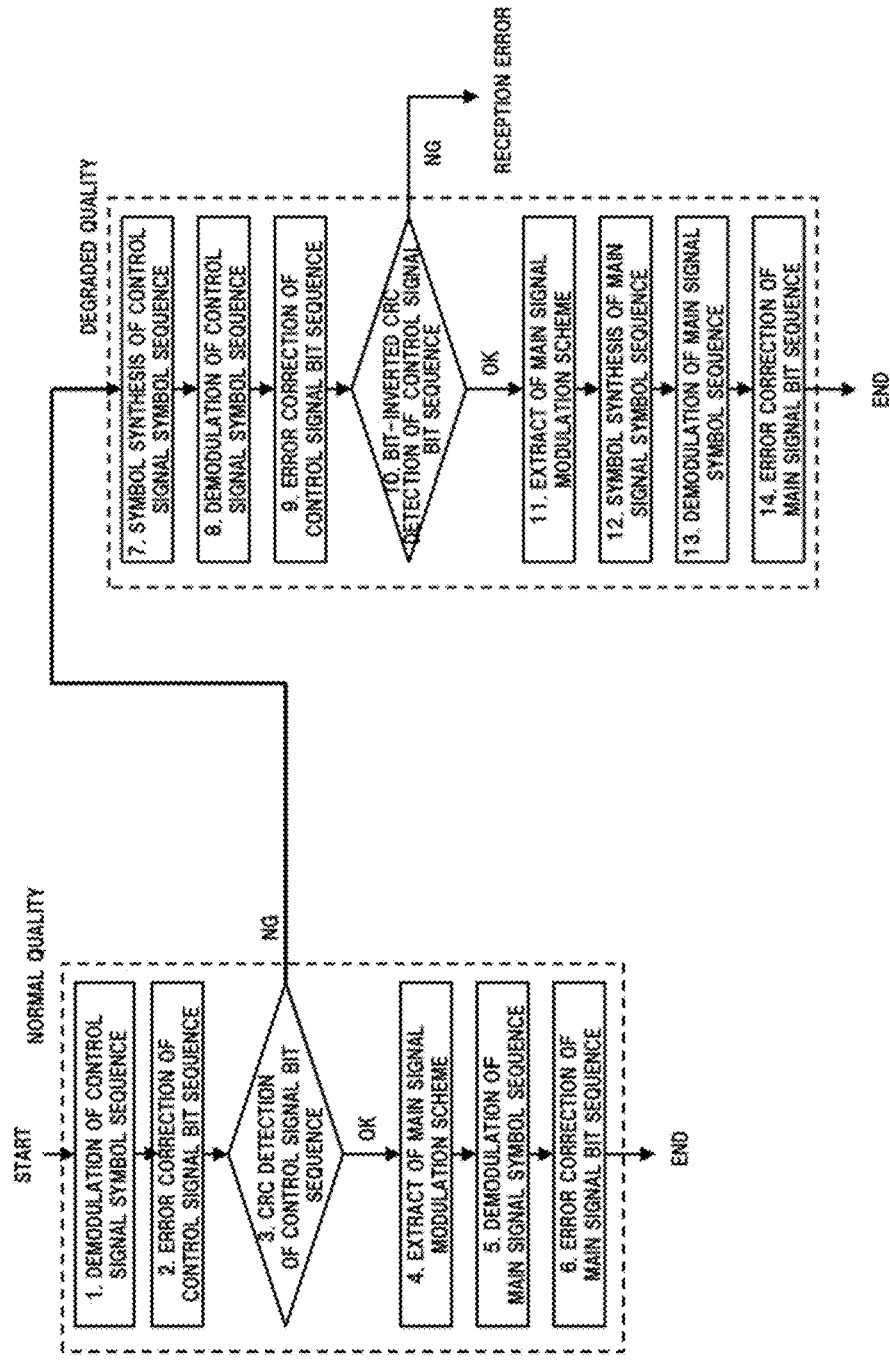
FIG. 6 is a processing flowchart of demodulation and decoding processing of a control signal and a main signal when switching is performed in two stages of a normal state and a line quality degradation state in the first exemplary embodiment of the present invention.

FIG. 6 shows a processing flow chart of the demodulation and decoding of the control signal and the main signal in the modulation scheme determination circuit 105 and the demodulation circuit 106 of the wireless communication apparatus on the receiving side. First, the wireless communication apparatus on the receiving side demodulates the first control signal symbol and generates a control signal bit sequence (Step 1 in FIG. 6).

Next, the wireless communication apparatus on the receiving side corrects the error of the control signal bit sequence obtained by demodulation (step 2 in FIG. 6).

Next, the wireless communication apparatus on the receiving side checks the error detection code (CRC) of the control signal bit sequence after error correction (Step 3 in FIG. 6). As a result of the detection, when the error detection codes match (OK in step 3 of FIG. 6), the wireless communication apparatus on the receiving side performs a normal main signal demodulation process. On the other hand, when the error detection codes do not match (NG in step 3 in FIG. 6), the wireless communication apparatus on the receiving side demodulates the control signal when the line quality is degraded (to the flow when the line quality is degraded in FIG. 6).

In the normal main signal demodulation process, first, the wireless communication apparatus on the receiving side derives the modulation scheme of the main signal stored in the control signal bit sequence (Step 4 in FIG. 6).

Next, the wireless communication apparatus on the receiving side demodulates the symbol sequence of the main signal using the derived modulation scheme (Step 5 in FIG. 6).

Finally, the wireless communication apparatus on the receiving side performs error correction and error detection on the bit sequence of the demodulated main signal (step 6 in FIG. 6).

In the demodulation process of the control signal when the line quality is degraded, first, the wireless communication apparatus on the receiving side performs symbol synthesis by averaging the symbol sequence of the repeatedly transmitted control signal (step 7 in FIG. 6).

Next, the wireless communication apparatus on the receiving side demodulates the symbol sequence of the control signal obtained by symbol synthesis to generate a control signal bit sequence (Step 8 in FIG. 6).

Next, the wireless communication apparatus on the receiving side corrects the error of the control signal bit sequence obtained by demodulation (step 9 in FIG. 6).

Next, the wireless communication apparatus on the receiving side checks the error detection code (CRC) of the control signal bit sequence after error correction (step 10 in FIG. 6). As a result of the detection, when the error detection code matches the bit-inverted code (OK in step 10 in FIG. 6), the receiving-side wireless communication apparatus performs a demodulation process of the main signal when the line quality is degraded. On the other hand, when the error detection codes do not match (NG in step 10 in FIG. 6), the wireless communication apparatus on the receiving side performs reception error processing.

In the demodulation process of the main signal when the line quality is degraded, first, the wireless communication apparatus on the receiving side derives the modulation scheme of the main signal stored in the control signal bit sequence (step 11 in FIG. 6).

Next, the wireless communication apparatus on the receiving side synthesizes the symbol sequence of the repeatedly transmitted main signal symbol (step 12 in FIG. 6).

Next, the wireless communication apparatus on the receiving side demodulates the symbol sequence of the main signal that has been symbol-synthesized using the derived modulation scheme (step 13 in FIG. 6).

Finally, the wireless communication apparatus on the receiving side performs error correction and error detection on the bit sequence of the demodulated main signal (step 14 in FIG. 6).

Figure 7:
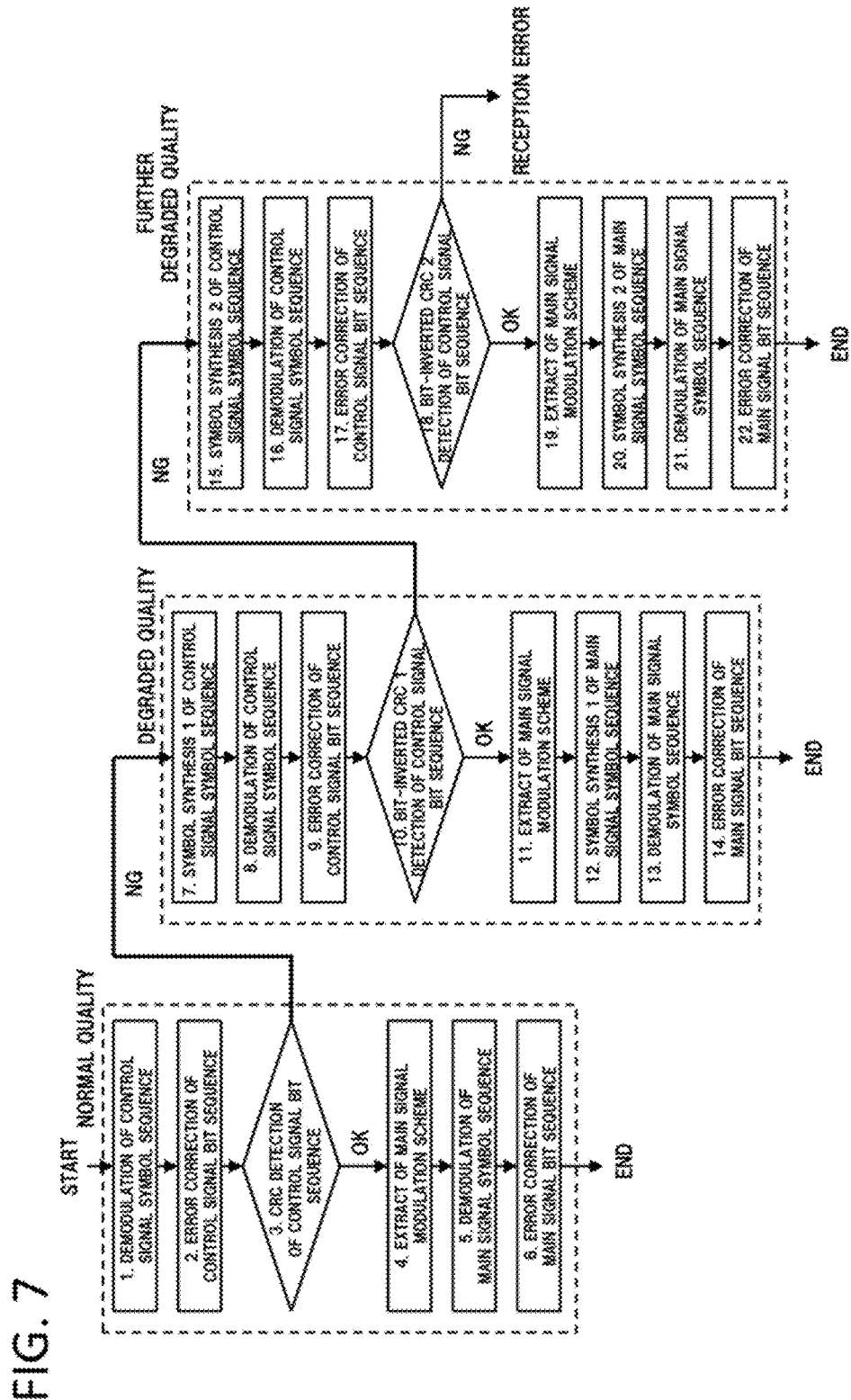
FIG. 7 is a processing flowchart of demodulation and decoding of a control signal and a main signal when switching is performed in three stages of a normal state, when the line quality is degraded, and when the line quality is further degraded in the first exemplary embodiment of the present invention

Note that the switching of the symbol synthesizing scheme of the control signal symbol sequence can be performed not only in two stages, that is, normal time and when the line quality is degraded, but also can be further increased. As an example, FIG. 7 shows a processing flow chart of demodulation and decoding of a control signal and a main signal when switching is performed in three stages: normal time, when the line quality is degraded, and when the line quality is further degraded. The major difference from the flow shown in FIG. 6 is that, instead of immediately determining a reception error when the error detection codes do not match in step 10, a transition is made to step 15 to try again detecting of the control signal bit sequence by increasing the number of symbols to be synthesized.

As described above, in the example of FIG. 7, in addition to the above-described two-stage switching, by increasing the number of repetitions of the control signal symbol sequence to be symbol-synthesized, it is possible to obtain a high reception gain at the time of further degrading of the line quality.

In addition, in the example of FIG. 7, it is preferable to set the bit inverted position of the bit inversion error detection code to a different position in order to distinguish between the case of line quality degradation and the case of further line quality degrading.

Figure 8:
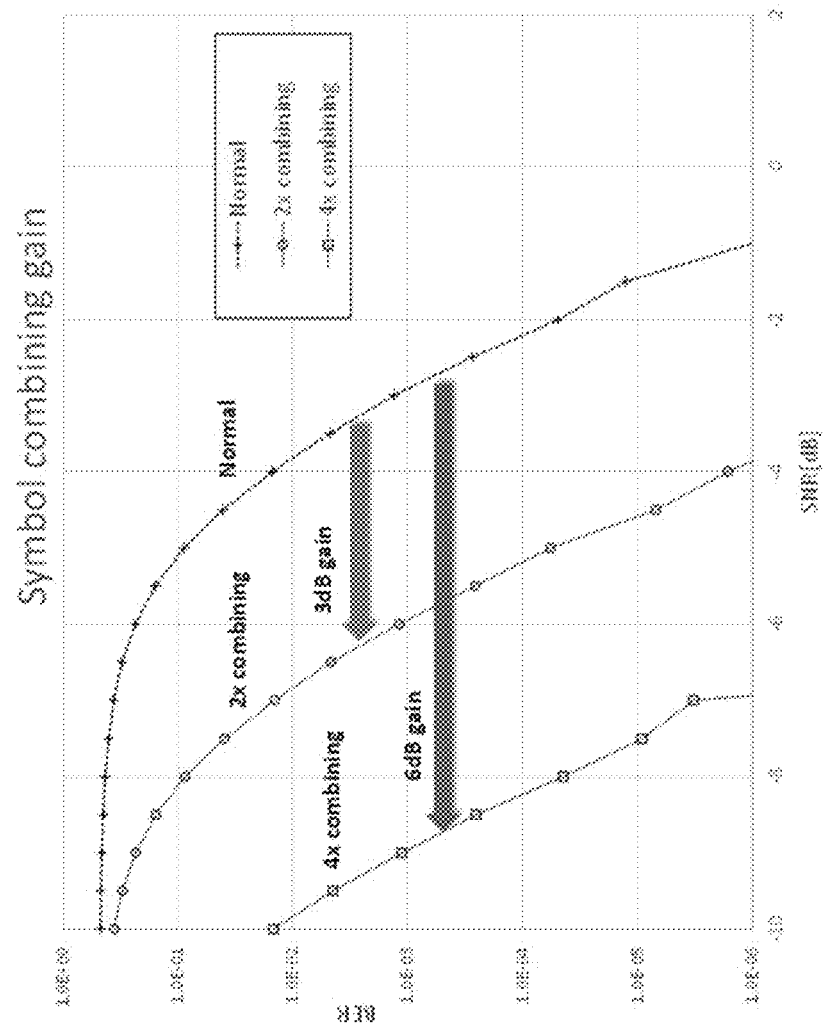
FIG. 8 is a diagram illustrating reception gains when two repetitively transmitted symbol sequences are symbol-combined and when four repetitively transmitted symbol sequences are symbol-combined.

FIG. 8 shows reception gains when two repeatedly transmitted symbol sequences are symbol-synthesized (2× combining) and when four repeatedly transmitted symbol sequences are synthesized (4× combining).

In this graph, the horizontal axis indicates the S/N ratio (SNR), and the vertical axis indicates the bit error rate (BER). A gain of about 3 dB is obtained when two symbol sequences are combined, and a gain of about 6 dB is obtained when four symbol sequences are combined. Accordingly, even in the case where a reception error occurs due to the degradation of the line quality in the flow of FIG. 6, the reception may be correctly performed in the flow of FIG. 7

Figure 9:
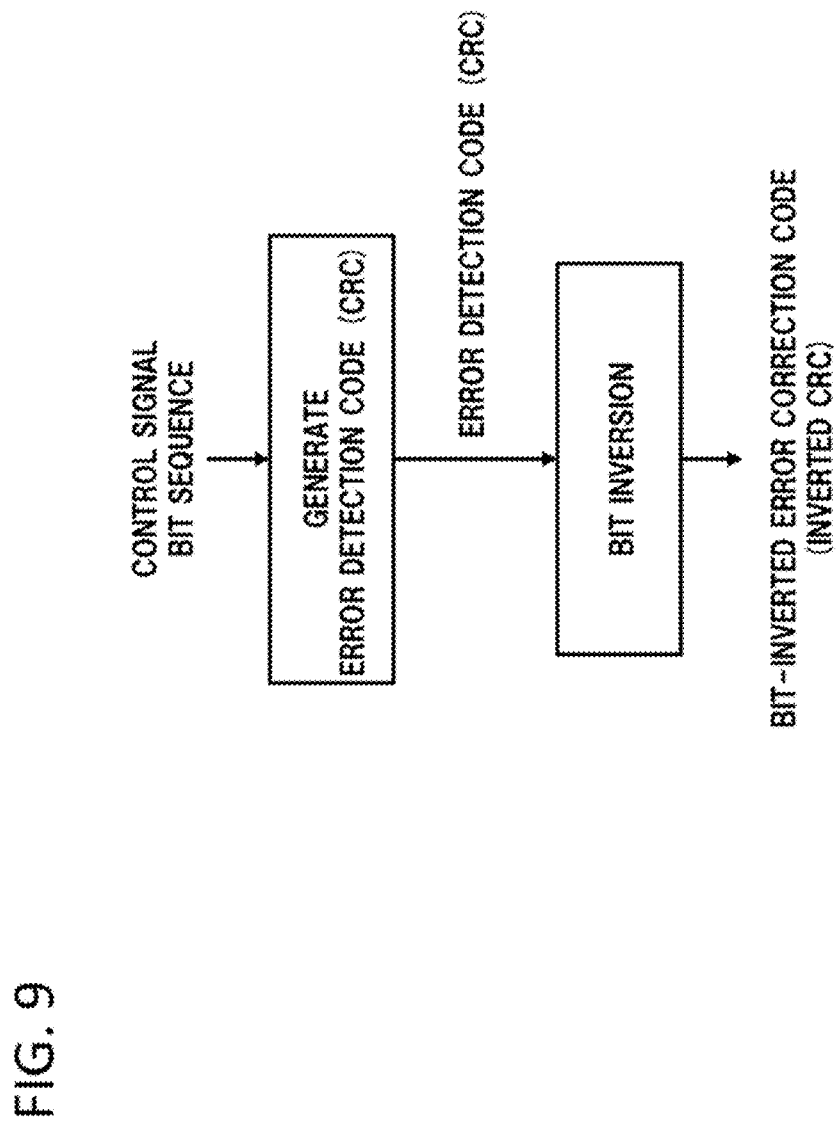
FIG. 9 is a diagram illustrating a method of generating a bit-inverted error detection code (inverted CRC) of a control signal bit sequence according to the first exemplary embodiment of the present invention.

FIG. 9 shows a method of generating a bit inverted error detection code (inverted CRC) of the control signal bit sequence in the above description. First, the modulation circuit 102 on the transmission side calculates an error detection code (CRC) of the control signal bit sequence.

Next, the modulation circuit 102 inverts all or some of the bits of the error detection code (CRC) to generate a bit-inverted error detection code (inverted CRC).

In order to prevent erroneous determination of the demodulation scheme during normal demodulation and at the time of line quality deterioration during demodulation, the number of inverted bits should be as large as possible. For example, when the number of bits of the error detection code is 24 bits, and when discriminating between two stages, that is, normal time and when the line quality is degraded, if the bits of all 24 bits are inverted, the Hamming distance at the time of detection of the error detection code becomes the shortest. Since it becomes larger, the probability of erroneous determination becomes smallest.

In general, assume that the number of bits of the error detection code is C and the type of modulation scheme to be determined is K, by inverting 2C/K bits, it is possible to maximize the hamming distance between the respective steps, thereby enabling to minimize the erroneous judgment probability.

For example, when the number of error detection code is 24 bits and three stages of the line quality which are either in a normal state, in a degraded line quality, and in further degraded line quality, have to be distinguished from one another, the following will be performed. First, at the time of degraded line quality, certain 16 bits are inverted. At the time of further degraded line quality, in total of 16 bits are inverted, of which 8 bits are the bits that are not inverted in the degraded line quality, and another 8 bits are the bits that are inverted in the degraded line quality. In this way, the hamming distance between all two of the three stages of the line quality, that is, between normal time and degraded, between degraded and further degraded, and between degraded [sic. normal time] and further degraded, all becomes 16 bits. Thereby the erroneous determination probability becomes the smallest.

Figure 10:
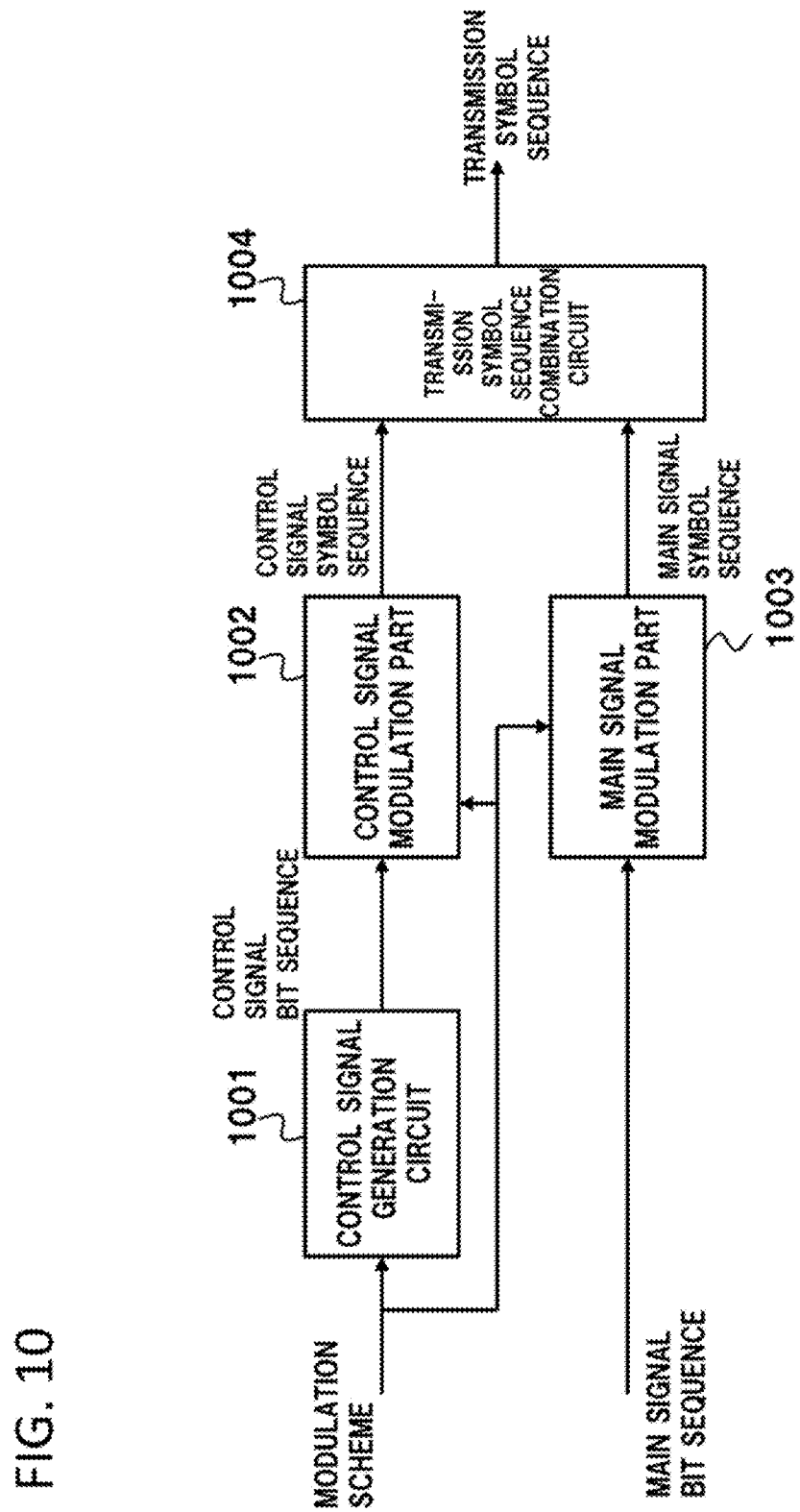
FIG. 10 is a diagram illustrating a configuration example of a modulation circuit according to the first exemplary embodiment of the present invention.

Subsequently, a configuration example of the modulation circuit 102 and the demodulation circuit 106 of the above wireless communication apparatus will be described. FIG. 10 illustrates a configuration example of the modulation circuit 102. The modulation circuit 102 shown in FIG. 10 includes a control signal generation circuit 1001, a control signal modulation part 1002, a main signal modulation part 1003, and a transmission symbol sequence combination circuit 1004. The modulation scheme (information) generated by the external line quality estimation circuit (reference numeral 101 in FIG. 1) is input to the control signal generation circuit 1001. The control signal generation circuit 1001 stores modulation scheme information in a control signal and generates a control signal bit sequence. The control signal bit sequence generated by the control signal generation circuit 1001 is modulated by the control signal modulation part 1002 to generate a control signal symbol sequence. At the same time, the main signal bit sequence is modulated by the main signal modulation part 1003, and a main signal symbol sequence is generated.

The control signal symbol sequence and the main signal symbol sequence are combined by a transmission symbol sequence synthesis circuit 1004 to generate a transmission symbol sequence.

Figure 11:
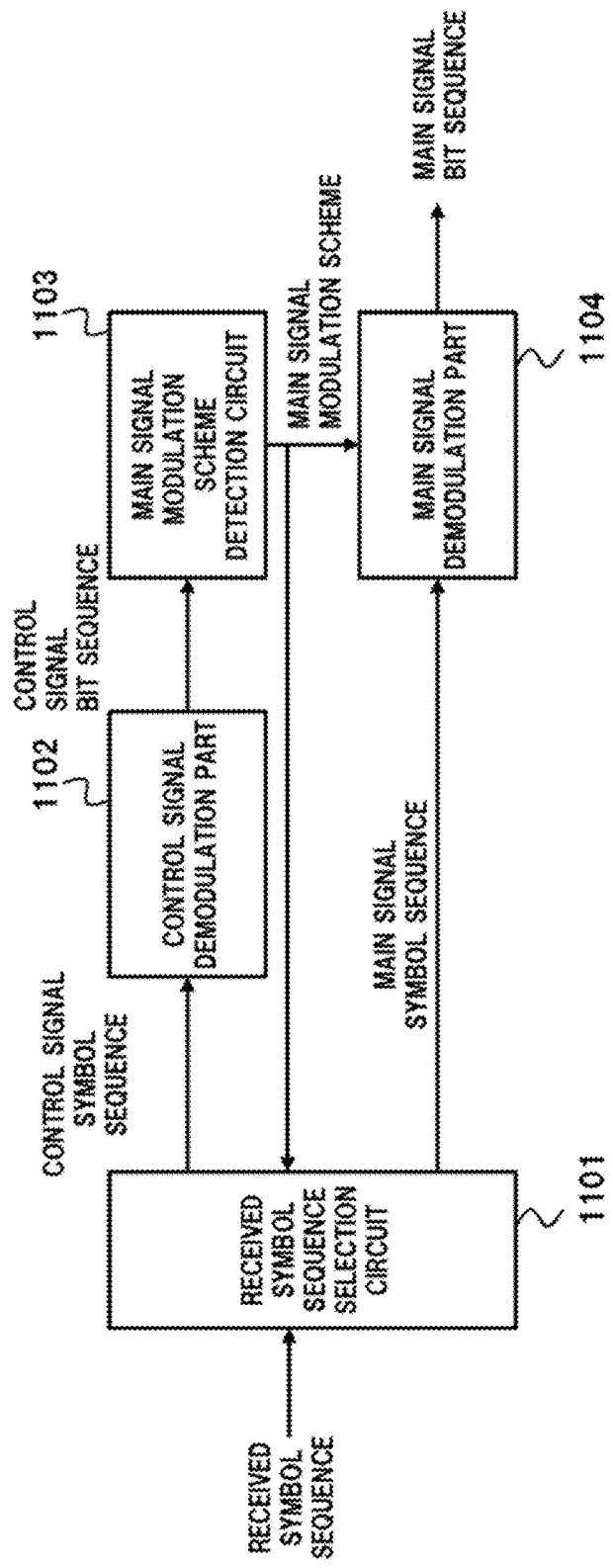
FIG. 11 is a diagram illustrating a configuration example of a demodulation circuit according to the first exemplary embodiment of the present invention.

FIG. 11 illustrates a configuration example of a circuit functioning as the modulation scheme determination circuit 105 and the demodulation circuit 106. The circuit shown in FIG. 11 includes a received symbol sequence selection circuit 1101, a control signal demodulation part 1102, a main signal modulation scheme detection circuit 1103, and a main signal demodulation part 1104. A control signal symbol sequence is selected from the received symbol sequence by a received symbol sequence selection circuit 1101. The control signal symbol sequence is demodulated and decoded by the control signal demodulator part 1102 to generate a control signal bit sequence.

Next, the main signal modulation scheme detection circuit 1103 extracts modulation scheme information of the main signal stored in the control signal bit sequence.

The modulation scheme information of the main signal obtained by the main signal modulation scheme detection circuit 1103 is transferred to the received symbol sequence selection circuit 1101. The received symbol sequence selection circuit 1101 selects a main signal symbol sequence from the received symbol sequence based on the main signal modulation scheme information.

Finally, the main signal demodulation part 1104 performs demodulation and decoding processing of the main signal using the selected main signal symbol sequence and the extracted main signal modulation scheme information, and generates a main signal bit sequence.

Figure 12:
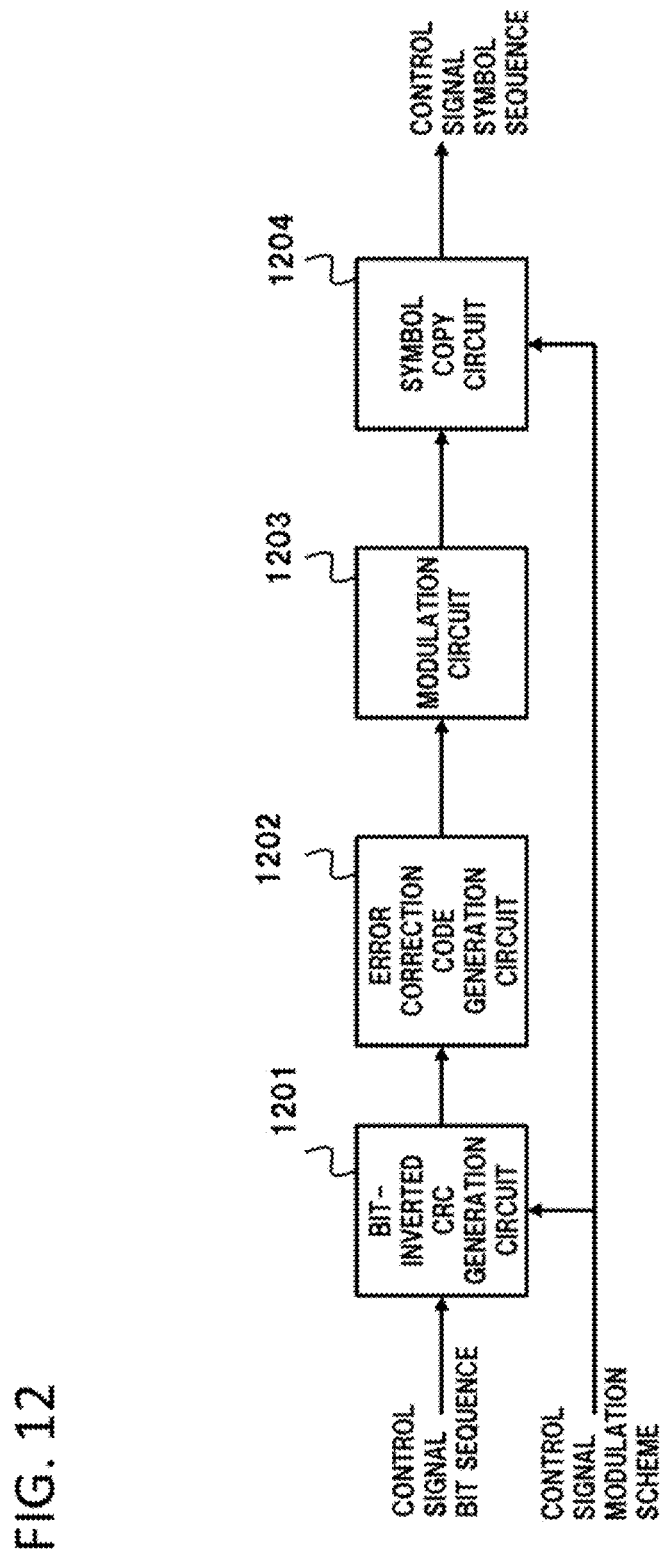
FIG. 12 is a diagram illustrating a configuration example of a control signal modulation part according to the first exemplary embodiment of the present invention.

Subsequently, a detailed configuration of main elements shown in FIGS. 10 and 11 will be described. FIG. 12 shows a configuration example of the control signal modulator part 1002. Control signal modulator part 1002 includes a bit-inverted CRC generation circuit 1201, an error correction code generation circuit 1202, a modulation circuit 1203, and a symbol copy circuit 1204.

The bit-inverted CRC generation circuit 1201 adds a CRC or a bit-inverted CRC to the control signal bit sequence based on the modulation scheme information. When the control signal modulation scheme is a modulation scheme for normal time (or state), a CRC is added, and when the control signal modulation scheme is a modulation scheme for use when the line quality is degraded, a bit-inverted CRC is added.

Next, the control signal bit sequence to which the CRC or the bit-inverted CRC is added is subjected to error correction encoding by an error correction code generation circuit 1202 and modulated by a modulation circuit 1203 to generate a control signal symbol sequence.

When the control signal modulation scheme is a normal modulation scheme, the signal is output as it is. When the control signal modulation scheme is a modulation scheme for line quality degradation time, the control signal symbol sequence is copied by the symbol copy circuit 1204, and plurality of control signal symbol sequences are output.

Figure 13:
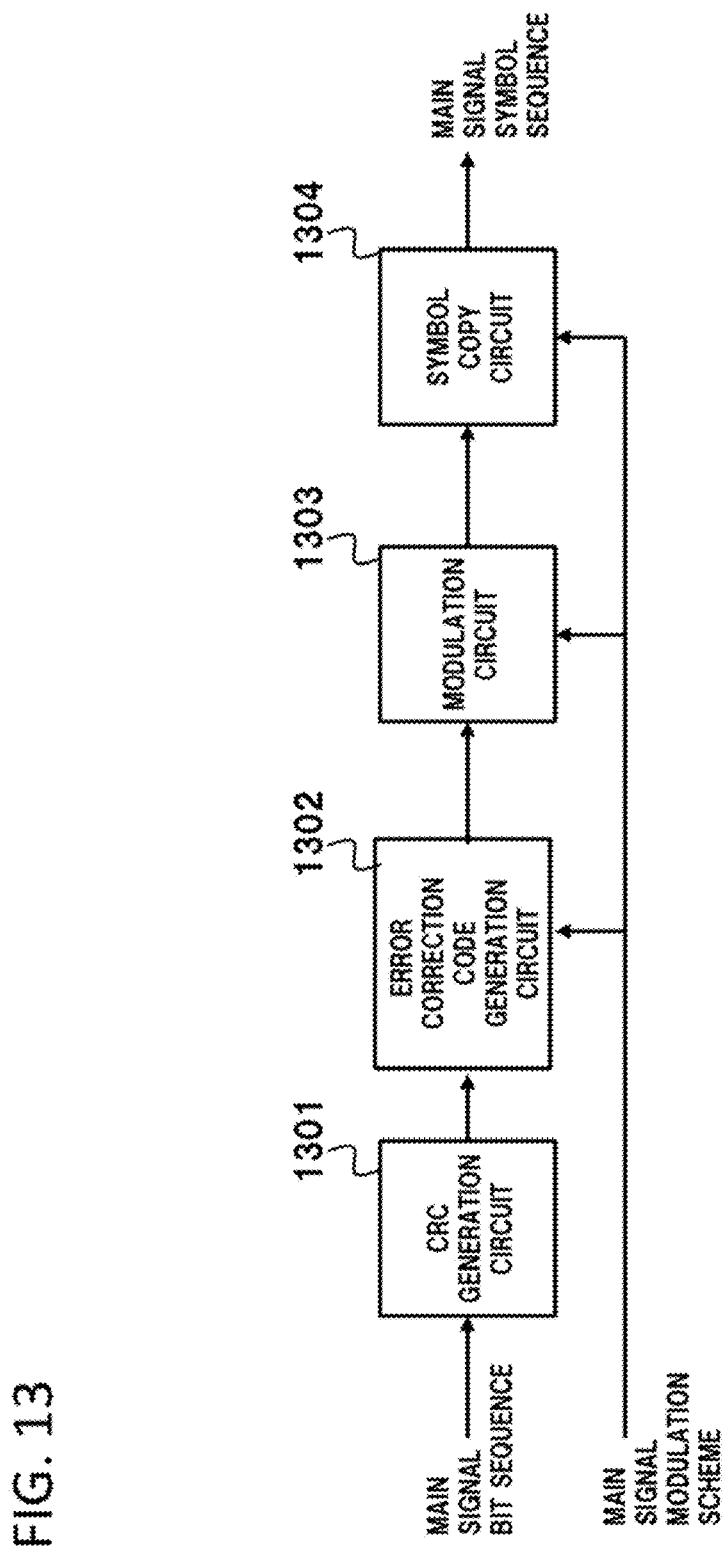
FIG. 13 is a diagram illustrating a configuration example of a main signal modulation part according to the first exemplary embodiment of the present invention.

FIG. 13 shows a configuration example of the main signal modulator part 1003. The main signal modulator part 1003 includes a CRC generation circuit 1301, an error correction code generation circuit 1302, a modulation circuit 1303, and a symbol copy circuit 1304.

The CRC generation circuit 1301 adds CRC to a main signal bit sequence. The main signal bit sequence to which the CRC has been added is subjected to error correction encoding by the error correction code generation circuit 1302 and modulated by the modulation circuit 1303. Here, when the modulation scheme is ones for the line quality degradation time, the main signal symbol sequence is copied by the symbol copy circuit 1304.

The code rate and the modulation scheme of the error correction in the error correction code generation circuit 1302 and the modulation circuit 1303 are switched by the main signal modulation scheme information given to the main signal modulation part 1003.

Figure 14:
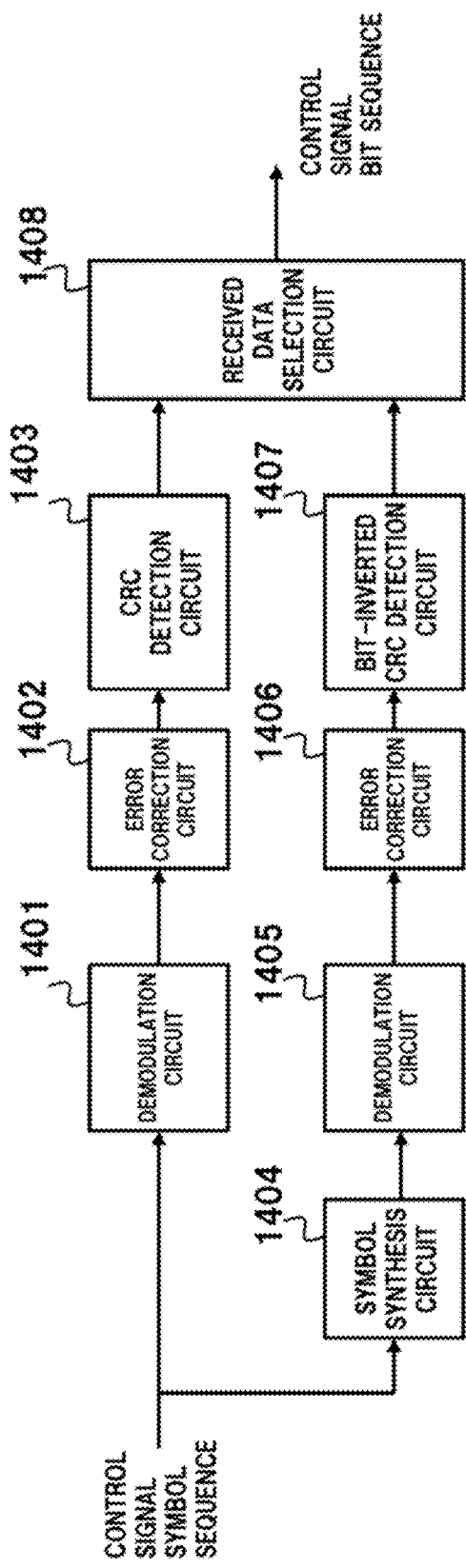
FIG. 14 is a diagram illustrating a configuration example of a control signal demodulation part according to the first exemplary embodiment of the present invention.

FIG. 14 shows a configuration example of the control signal demodulation part 1102. The control signal demodulation part 1102 includes demodulation circuits 1401 and 1405, error correction circuits 1402 and 1406, a CRC detection circuit 1403, a symbol synthesis circuit 1404, a bit-inverted CRC detection circuit 1407, and a received data selection circuit 1408.

The control signal symbol sequence input to control signal demodulation part 1102 is demodulated by demodulation circuit 1401. Next, error correction is performed by the error correction circuit 1402, and a bit error is detected by the CRC detection circuit 1403. When a bit error is not detected by CRC detection circuit 1403, received data selection circuit 1408 outputs a control signal bit sequence after error correction as a control signal bit sequence. The above flow corresponds to steps 1 to 3 in FIG. 6.

When a bit error is detected by the CRC detection circuit 1403, the symbol synthesis circuit 1404 synthesizes a plurality of transmitted control signal symbol sequences. The synthesized control signal symbol sequence is demodulated by a demodulation circuit 1405, and error correction is performed by the error correction circuit 1406. Next, an error detection code (CRC) is detected by the bit-inverted CRC detection circuit 1407. When the error detection code matches the bit-inverted code, the received data selection circuit 1408 synthesizes a symbol as a control signal bit sequence, and a control signal bit sequence after demodulation and error correction is output. The above flow corresponds to steps 7 to 10 in FIG. 6.

Figure 15:
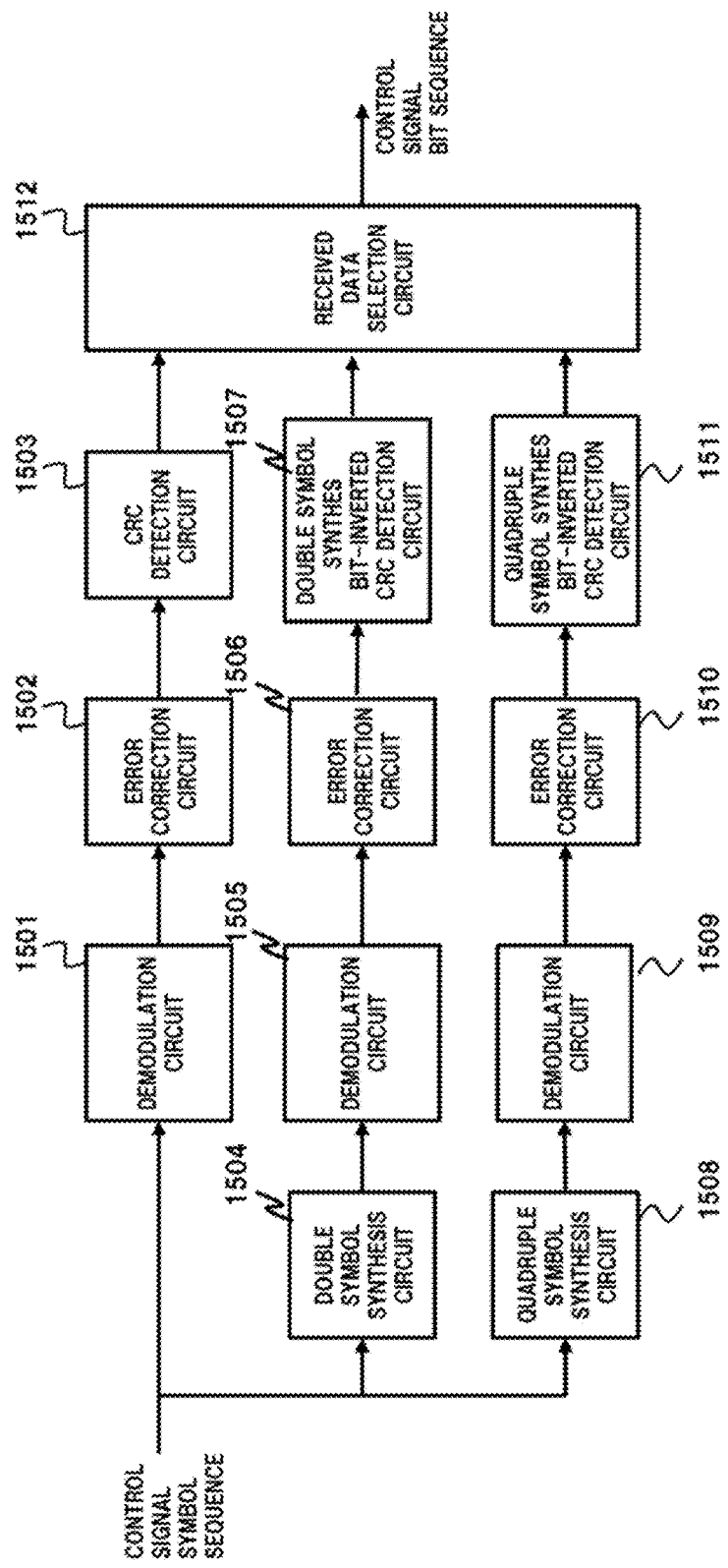
FIG. 15 is a diagram illustrating a modified (variant) configuration example of the control signal demodulation part according to the first exemplary embodiment of the present invention.

FIG. 15 shows another configuration example of the control signal demodulation part 1102. In this configuration example, it is possible to implement the flow described with reference to FIG. 7 in which the modulation scheme is switched in a total of three stages, that is, (one stage) at normal time and two stages when the line quality is degraded.

First, the input control signal symbol sequence is demodulated by a demodulation circuit 1501, error correction is performed by an error correction circuit 1502, and a bit error is detected by a CRC detection circuit 1503. If a bit error is not detected by CRC detection circuit 1503, received data selection circuit 1512 outputs the error-corrected control signal bit sequence as a control signal bit sequence. The above flow corresponds to steps 1 to 3 in FIG. 7.

When a bit error is detected by the CRC detection circuit 1503, as to the control signal symbol sequence symbol-synthesizing is performed by a double symbol synthesis circuit 1504 on the control signal symbol sequence which has been transmitted two times. The control signal symbol sequence synthesized by the double symbol synthesis circuit 1504 is demodulated by a demodulation circuit 1505, error correction is performed by an error correction circuit 1506, and error detection code (CRC) detection (checking) is performed. As a result of the detection, when no error is detected, a received data selection circuit 1512 performs double symbol synthesis to provide a control signal bit sequence, and outputs as a control signal bit sequence after demodulation and error correction. The above flow corresponds to steps 7 to 10 in FIG. 7.

When an error is detected by the bit-inverted CRC detection circuit for double symbol synthesis 1507, the control signal symbol sequence is subjected to symbol-synthesis of the control signal symbol sequence transmitted four times by the quadruple symbol synthesis circuit 1508. The control signal symbol sequence synthesized by the quadruple symbol synthesis circuit 1508 is demodulated by a demodulation circuit 1509, error correction is performed by an error correction circuit 1510, and error detection code (CRC) detection is performed for by a bit-inverted CRC detection circuit 1511 for quadruple symbol-synthesis. As a result of the detection, when no error is detected, a received data selection circuit 1512 outputs a control signal bit sequence subjected to quadruple symbol synthesis after demodulation and error correction as a control signal bit sequence. The above flow corresponds to steps 15 to 18 in FIG. 7.

Figure 16:
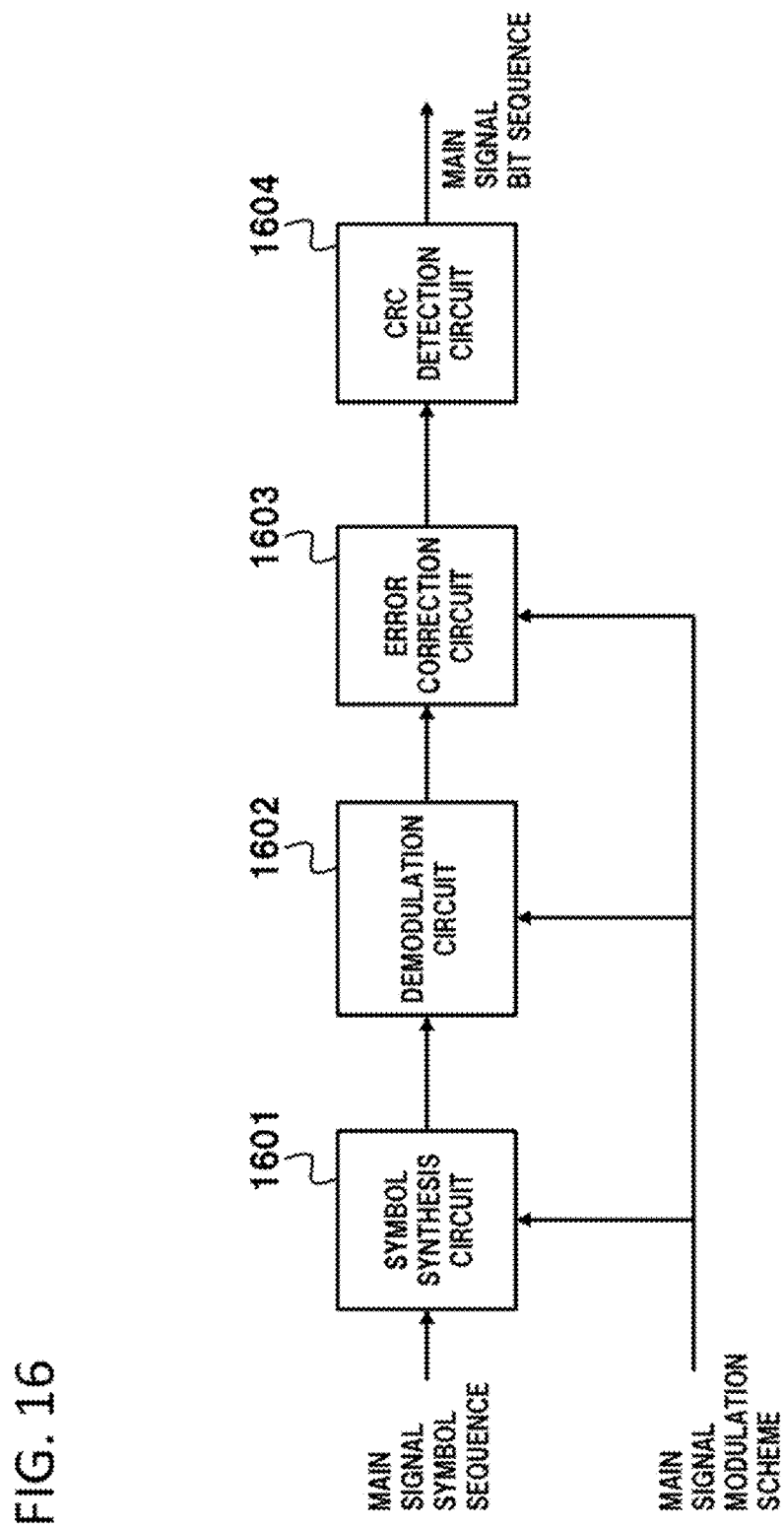
FIG. 16 is a diagram illustrating a configuration example of a main signal demodulation part according to the first exemplary embodiment of the present invention.

FIG. 16 shows a configuration example of the main signal demodulator part 1104. The main signal demodulator part 1104 includes a symbol synthesizing circuit 1601, a demodulation circuit 1602, an error correction circuit 1603, and a CRC detection circuit 1604. First, the main signal symbol sequence is subjected to symbol synthesis processing in a symbol synthesis circuit 1601.

Here, symbol synthesis circuit 1601 performs symbol synthesizing of the main signal symbol sequence when it is indicated that a plurality of main signal symbol sequences have been transmitted as the main signal modulation scheme, and otherwise outputs the signal sequence as it is.

Next, demodulation processing is performed in the demodulation circuit 1602, and error correction is performed in the error correction circuit 1603. Finally, an error detection is performed by the CRC detection circuit 1604, and if no error is detected, output is performed as a main signal bit sequence. The above flow corresponds to Steps 4 to 6 or Steps 11 to 14 in FIG. 6 In the case of FIG. 7, the above flow is performed in steps 4 to 6, or steps 11 to 14, or steps 19 to 22.

Figure 17:
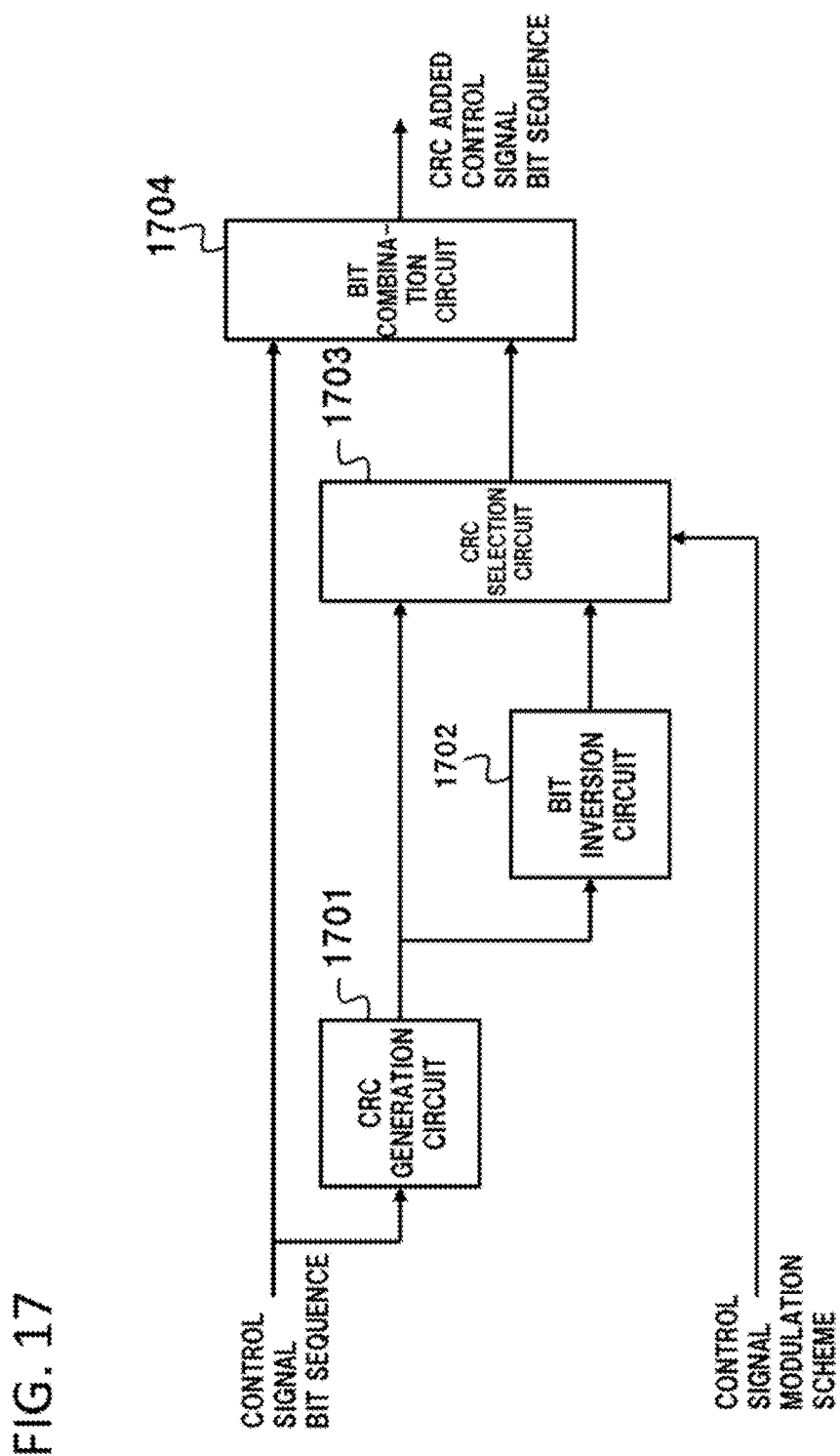
FIG. 17 is a diagram showing an example of structure of bit inverted CRC detection circuit in a first exemplary embodiment of the present invention.

FIG. 17 shows a configuration example of the bit-inverted CRC detection circuit (reference number 1407 in FIG. 14). The bit-inverted CRC detection circuit of FIG. 17 includes a CRC generation circuit 1701, a bit-inversion circuit 1702, a CRC selection circuit 1703, and a bit-combination circuit 1704.

First, the CRC generation circuit 1701 generates an error detection code (CRC) for the control signal bit sequence. Next, the error detection code is bit-inverted by a bit-inversion circuit 1702. When the control signal modulation scheme is at normal time (or state), the CRC selection circuit 1703 outputs the error detection code as it is. On the other hand, when the control signal modulation scheme is at the time of line deterioration, the bit-inverted error detection code is output.

Finally, the bit-combination circuit 1704 combines the control signal bit sequence and the error detection code output from the CRC selection circuit 1703, and outputs the control signal bit sequence after CRC addition.

Figure 18:
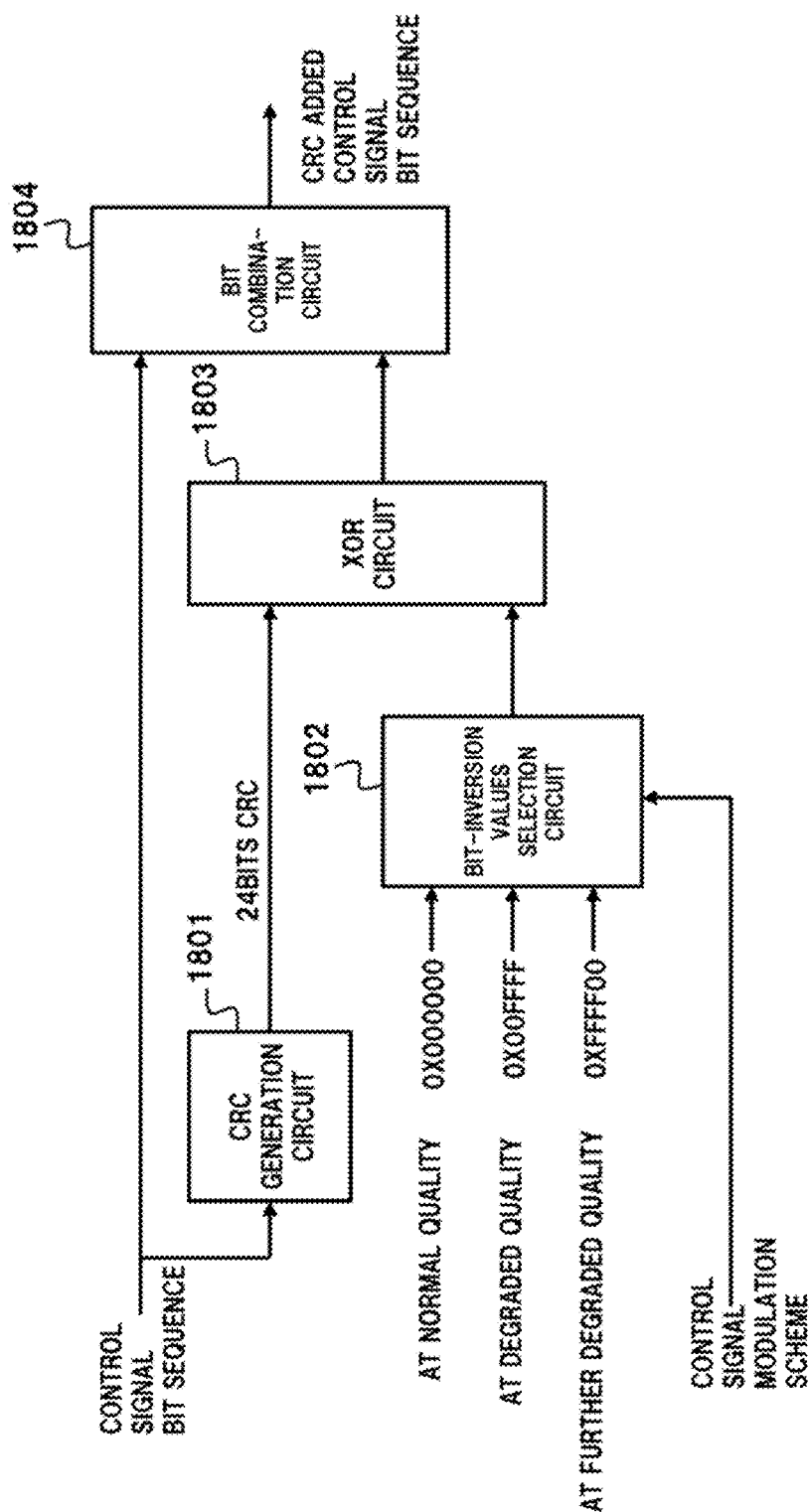
FIG. 18 is a diagram showing another example of structure of bit inverted CRC detection circuit in a first exemplary embodiment of the present invention.

FIG. 18 shows another configuration example of the bit-inverted CRC detection circuit. The bit-inverted CRC detection circuit in FIG. 18 includes a CRC generation circuit 1801, a bit-inversion value selection circuit 1802, an XOR circuit 1803, and a bit-combination circuit 1804. In this configuration example, a control signal bit sequence after addition of a CRC is generated in a total of three stages, that is, a normal stage and line quality degradation stages in two stages. Therefore, the bit-inverted CRC detection circuit in FIG. 18 has a configuration corresponding to the bit-inverted CRC detection circuit for double symbol synthesis 1507 and the bit-inverted CRC detection circuit for quadruple symbol synthesis 1511 in FIG. 15.

First, the CRC generation circuit 1801 generates a 24-bit error detection code (CRC) of the control signal bit sequence. Next, in accordance with the control signal modulation scheme, a bit inversion value 0x000000 (hexadecimal) for normal time, a bit inversion value 0x00FFFF for the time of the degraded line quality, or a bit inversion value 0xFFFF00 for the time of the line quality further degraded, that is, three types of bit inversion values, are selected by the bit-inversion value selection circuit 1802.

Next, the XOR circuit 1803 performs an XOR operation on the 24-bit CRC generated by the CRC generation circuit 1801 and the bit-inversion value selected by the bit-inversion value selection circuit 1802 to generate a bit-inverted CRC. Finally, the control signal bit sequence and the bit-inversed CRC are combined by the bit-combination circuit 1804 to generate a control signal bit sequence after CRC addition (CRC added Control Signal Bit Sequence).

Here, the three types of bit inversion values are set as 0x000000 (hexadecimal number) for normal time, 0x00FFFF for the degraded line quality, and 0xFFFF00 for the time of further degraded line quality. This is because the Hamming distance between the bit inversion values between the stages is maximized, and the erroneous determination probability is minimized.

As described above, according to the first exemplary embodiment of the present invention, communication can be performed even when the signal quality is significantly degraded. The reason is that a configuration is employed in which the transmission side repeatedly transmits the control signal and the main signal, and the reception side synthesizes the symbols of the control signal to improve the gain. Further, according to the first exemplary embodiment of the present invention, the transmission speed during the line quality is good is not affected. The reason is that, a configuration is adopted in which the main signal is demodulated in a normal state, when it is determined that the signal quality is good in the CRC detection of the bit sequence of the control signal.

In other words, the present invention can also be understood as a wireless communication apparatus comprising a modulation scheme determination circuit 105 that synthesizes symbol sequence of control signal included in received data and determines the symbol sequence is transmitted more than once by detecting error detecting code included in the symbol is bit-inverted or not, and a demodulation circuit 106 that demodulates received data according to the determination result.

Second Exemplary Embodiment

Next, a description will be given of a second exemplary embodiment of the present invention in which an OFDM (Orthogonal Frequency Division Multiplexing) scheme is applied to the secondary modulation. The OFDM scheme is a technique of mapping a symbol sequence to be transmitted to subcarriers arranged in the frequency direction, generating an OFDM symbol by Fourier inverse transform, and transmitting the OFDM symbol, thereby increasing frequency use efficiency and reducing interference between symbols.

Figure 19:
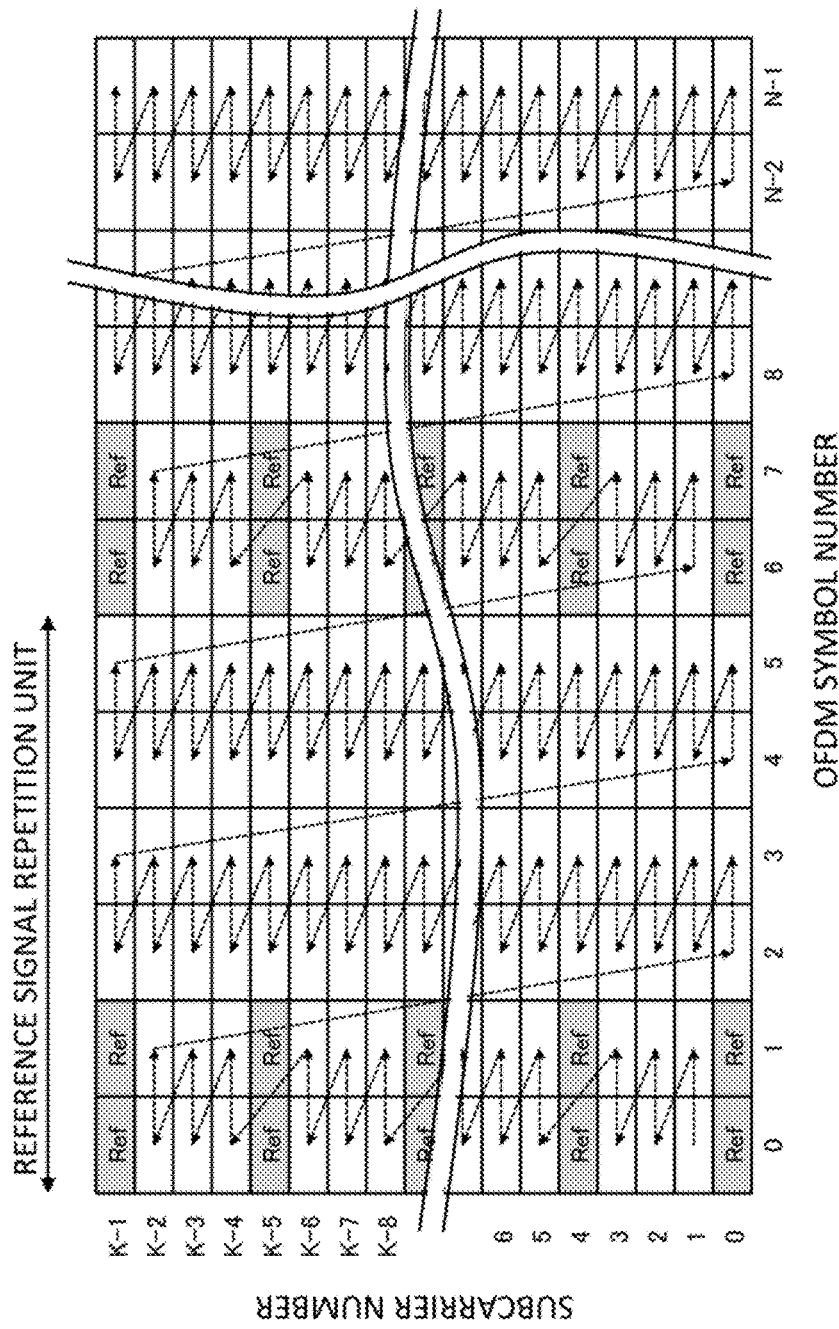
FIG. 19 is a diagram illustrating an example of mapping of a symbol sequence to an OFDM symbol, as an illustration of a second exemplary embodiment of the present invention.

FIG. 19 shows an example of a symbol sequence mapping method in the OFDM scheme. The vertical axis indicates the subcarrier number of the OFDM symbol, and the horizontal axis indicates the OFDM symbol number. Normally, in the OFDM scheme, a reference signal (Ref in the figure) is mapped in a pattern of a combination of a fixed subcarrier number and an OFDM symbol number. The reference signal is used for demodulation on the receiving side. Usually, the mapping of the reference signal is repeatedly performed at a constant cycle. In the example of FIG. 19, mapping is performed repeatedly in units of 6 OFDM symbols.

The symbol sequence is mapped to subcarriers other than the reference signal. In the example of FIG. 19, the symbol sequence is mapped, as follows, first to the subcarrier of OFDM symbol number 0 and subcarrier number 1, then to the subcarrier of OFDM symbol number and subcarrier number 1, then to OFDM symbol number 0 and subcarrier number 2, and so on.

In the OFDM scheme, the receiving side performs a Fourier transform process to convert the signal into subcarrier signals, and then performs a demodulation process. Normally, symbol synthesis is performed by adding repeatedly transmitted subcarrier signals. Here, by repeatedly transmitting in OFDM symbol units, symbol synthesis can be performed by synthesizing OFDM symbols before Fourier transform processing.

Figure 20:
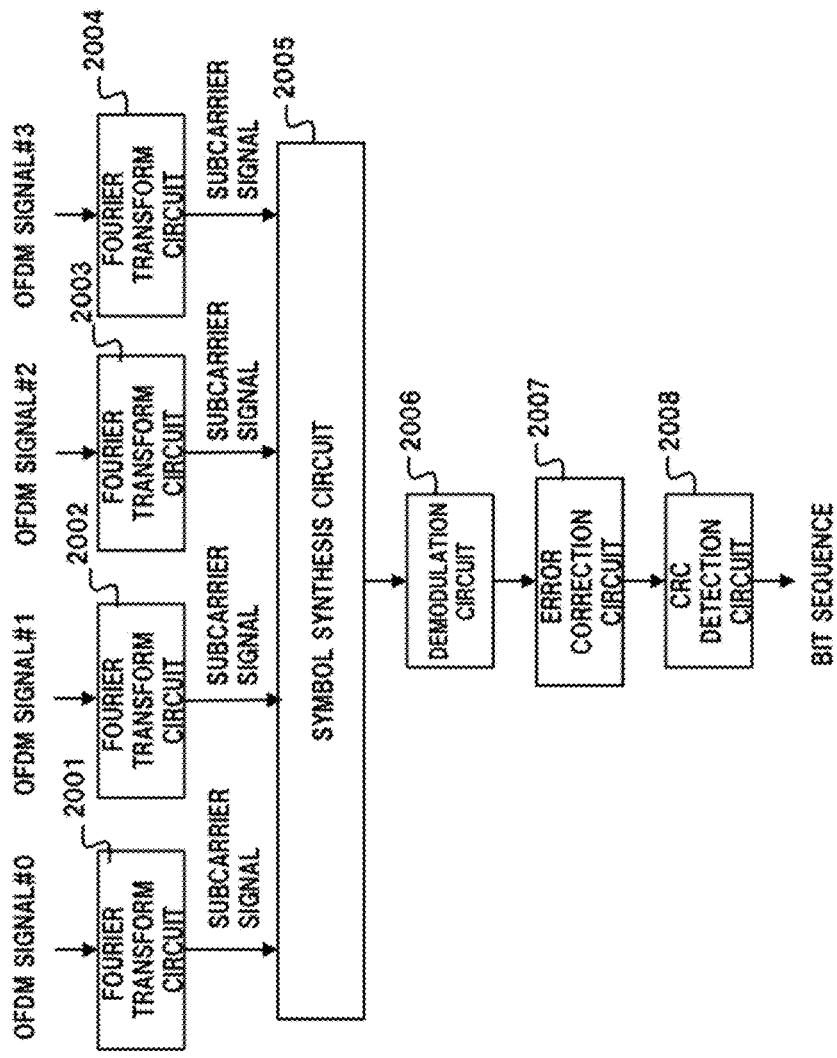
FIG. 20 is a diagram illustrating an example of symbol synthesis processing per subcarrier unit.
Figure 21:
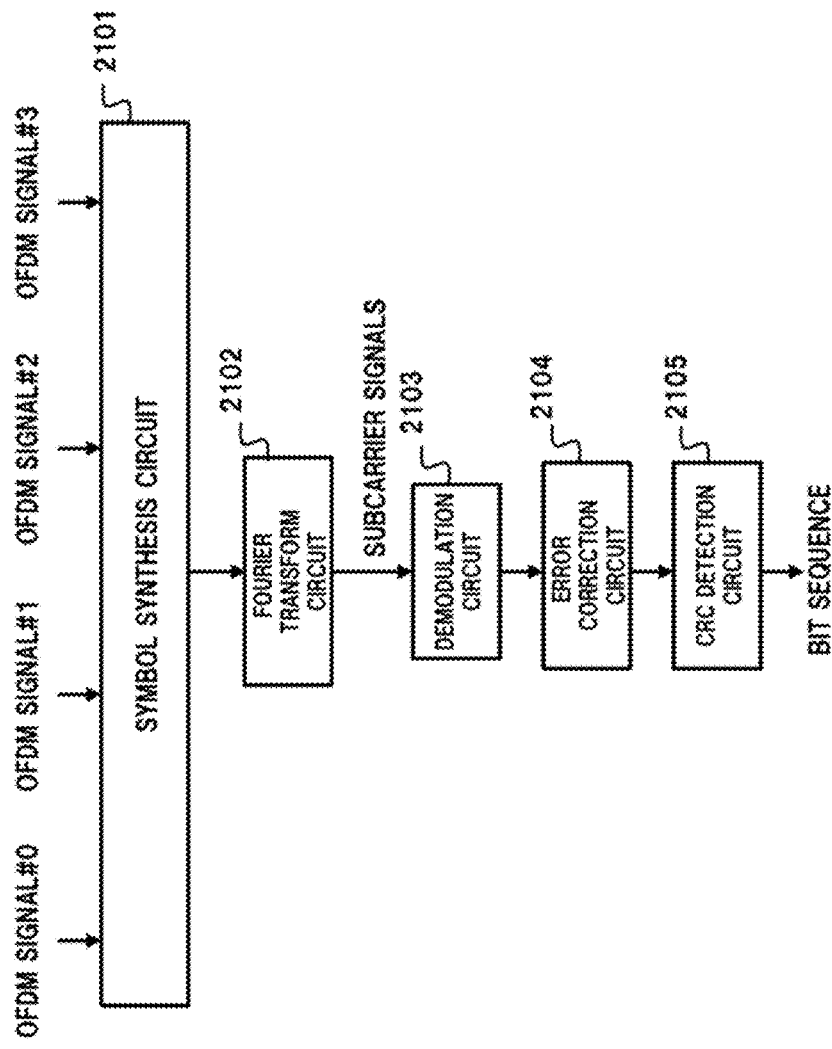
FIG. 21 is a diagram illustrating an example of symbol synthesis processing in OFDM symbol unit.

FIG. 20 shows a flow of processing when performing symbol synthesis using subcarrier signals, and FIG. 21 shows a flow of processing when performing symbol synthesis using an OFDM signal(s).

When performing symbol combining with the subcarrier signals of FIG. 20, each OFDM signal is converted into a subcarrier signal by Fourier transform circuits 2001 to 2004, and the subcarrier signals are subjected to symbol synthesis by the symbol synthesis circuit 2005. A demodulation circuit 2006 demodulates the synthesized symbol, corrects error in an error correction circuit 2007, and finally detects error in a CRC detection circuit 2008.

When performing symbol synthesis with the OFDM signal(s) in FIG. 21, the symbol synthesis is performed by the symbol synthesis circuit 2101 with the OFDM signal being unchanged. Then, the signal is converted into subcarrier signals by a Fourier transform circuit 2102, demodulation processing is performed by a demodulation circuit 2103, error correction is performed by an error correction circuit 2104, and finally, error detection is performed by a CRC detection circuit 2105.

As described above, when symbol synthesis is performed using an OFDM signal(s), the amount of processing can be reduced because Fourier transform processing can be reduced.

Figure 22:
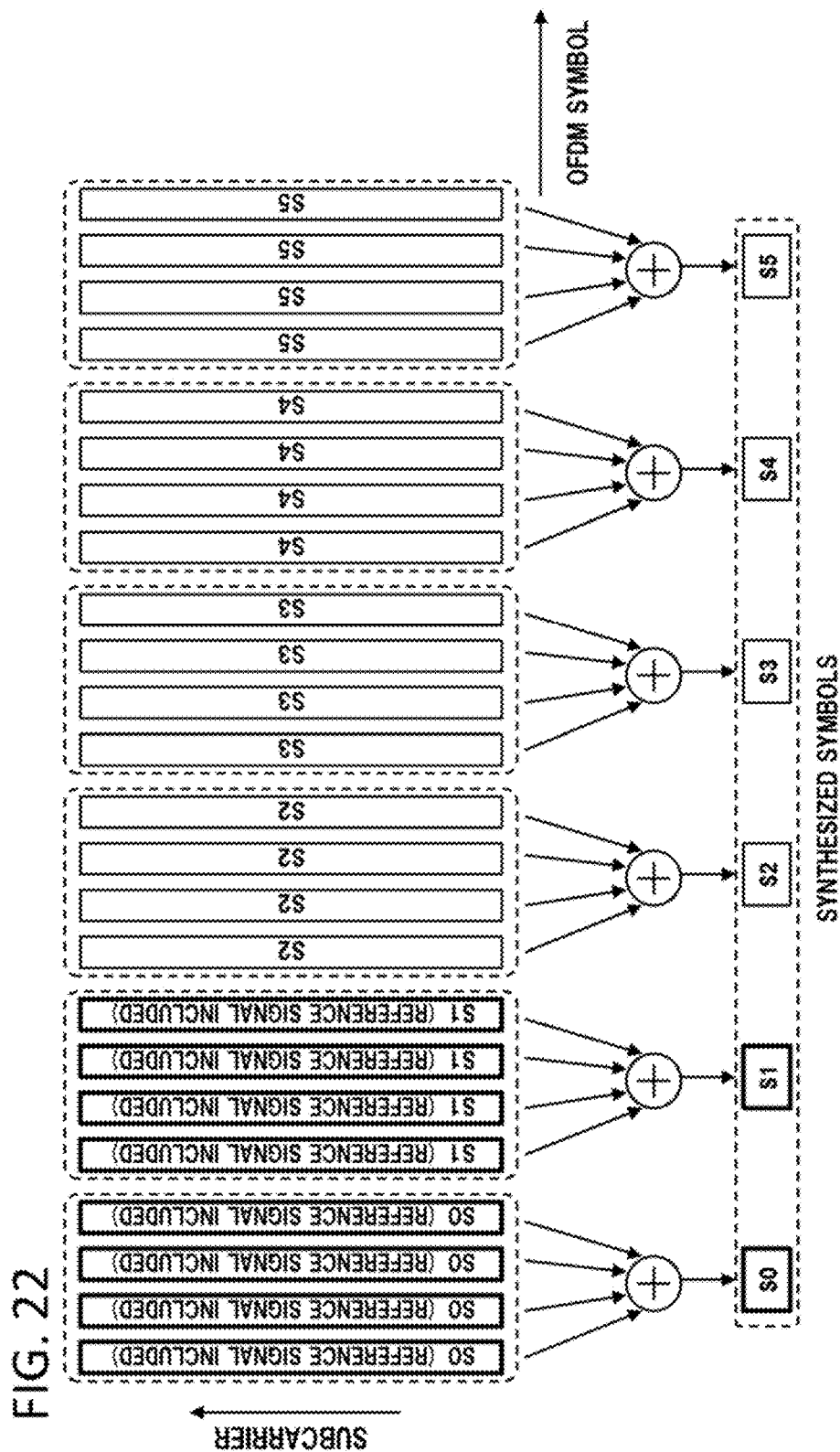
FIG. 22 is a diagram illustrating an example of repeated transmission per OFDM symbol unit.
Figure 23:
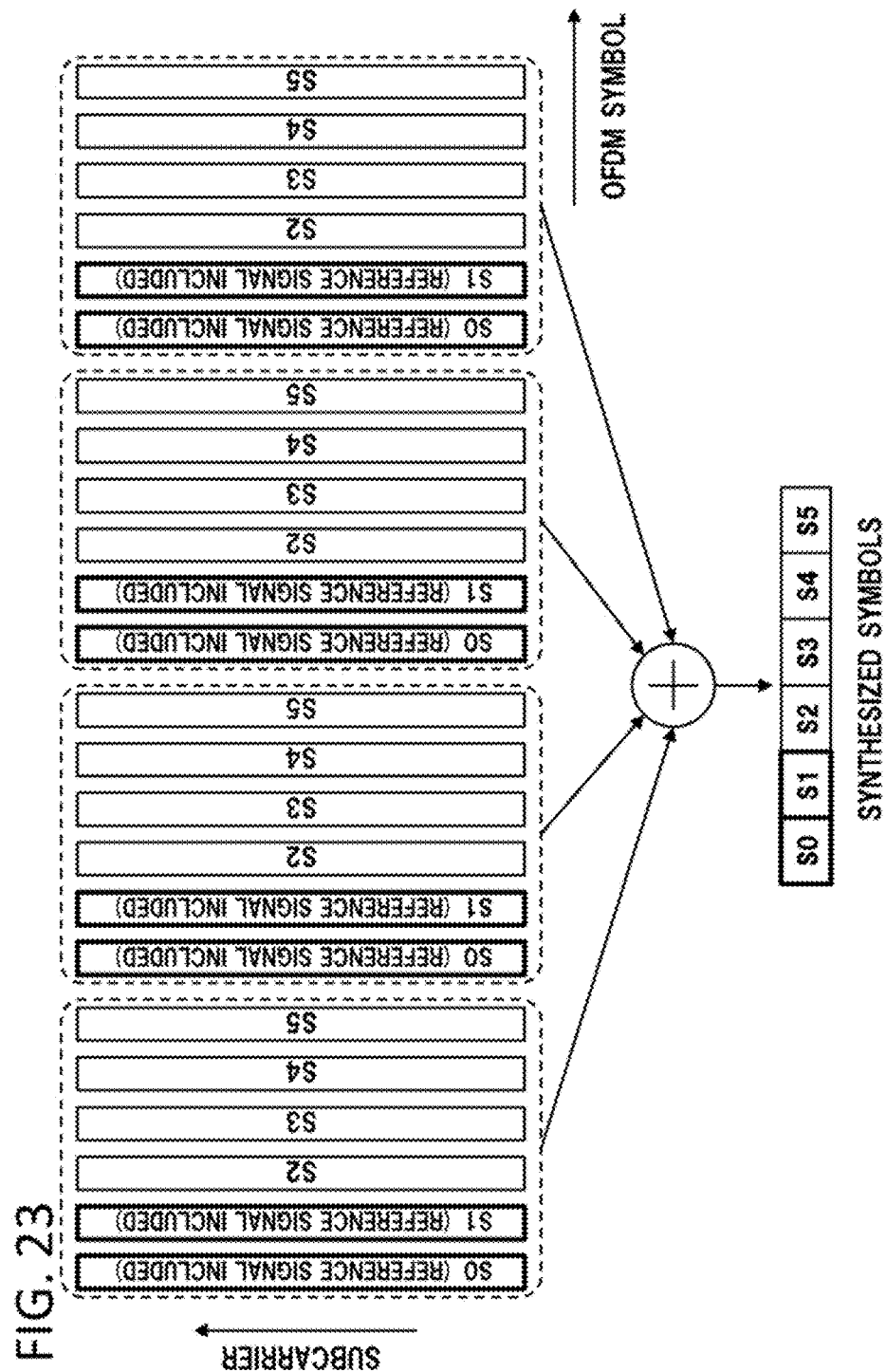
FIG. 23 is a diagram illustrating an example of repeated transmission of a reference signal repetition unit.

FIG. 22 shows an example in which a single OFDM symbol is consecutively and repeatedly transmitted, and FIG. 23 shows an example in which an OFDM symbol is repeatedly transmitted in reference signal repetition units.

Both the example in FIG. 22 and the example in FIG. 23 perform repetitive transmission per OFDM symbol unit, so that it is possible to perform symbol synthesis per OFDM symbol unit.

As described above, in the present invention, demodulation is performed on the receiving side, error correction is performed, and it is determined whether or not a symbol is repeated by the CRC detection. For example, in the example of FIG. 22, the position of the reference signal changes between when the OFDM symbol is not repeated and when it is repeated. For this reason, in a case where OFDM symbols are repeatedly transmitted, when the receiving side performs demodulation processing regarding that the OFDM symbols are not repeatedly transmitted, demodulation cannot be performed correctly, whereby the erroneous judgment probability increases in the judgment as to whether it is repeated symbol transmission time in the degraded line quality time (state).

In the example of FIG. 23, since the position of the reference signal is the same when the symbol is repeated and when the symbol is not repeated, there is an advantage that the erroneous determination probability does not increase in the determination of whether or not the symbol is repeatedly transmitted.

As described above, the present invention can be applied to the case where the OFDM scheme is used for the secondary modulation, and can provide the same effects as those of the first exemplary embodiment.

Each part (each circuit) of the wireless communication apparatus shown in FIG. 10 to FIG. 18, FIG. 20, FIG. 21 and so on does not need to be entirely configured by hardware, but may be implemented by using a processor mounted on the wireless communication apparatus, by way of a computer program that executes the above-described processes by using the hardware thereof.

As described above, each embodiment of the present invention has been described, but the present invention is not limited to the above-described exemplary embodiments, and further modified, replaced, and adjusted without departing from the basic technical idea of the present invention. For example, the network configuration, the configuration of each element, and the expression form of a message illustrated in each drawings. are examples for helping the understanding of the present invention, and are not limited to the configurations illustrated in these drawings. In the following description, "A and/or B" is used to mean at least any one of A and B.

It is to be noted that each of the disclosures in the abovementioned patent literatures is incorporated herein by reference. Modifications and adjustments of exemplary embodiments and examples are possible within the ambit of the entire disclosure (including exemplary the claims) of the present invention, and also based on fundamental technological concepts thereof. Furthermore, a wide variety of combinations and selections of various disclosed elements is possible within the ambit of the present invention. That is, the present invention clearly includes every type of transformation and modification that a person skilled in the art can realize according to the entire disclosure including the claims and to technological concepts thereof. In particular, with respect to the numerical ranges described in this application, any numerical values or small ranges included in the range(s) should be interpreted as being specifically described even if not otherwise specified.

Modes

Finally, preferable modes of the present invention will be summarized.

[Mode 1]

(Refer to above mentioned wireless communication apparatus of the first aspect of the present invention.)

[Mode 2]

The wireless communication apparatus described above wherein the second detection circuit can detect a second error detection code obtained by inverting 2C/K bits assuming that C is a number of bits of the first error detection code and K is a type of modulation scheme to be determined.

[Mode 3]

The wireless communication apparatus described above wherein the symbol synthesis circuit performs the symbol synthesis per OFDM symbol units.

[Mode 4]

The wireless communication apparatus described in Mode 3 wherein the symbol synthesis circuit performs the symbol synthesis per reference signal repetition units.

[Mode 5]

The wireless communication apparatus described above wherein the second error detection code is added to a control signal indicating the modulation scheme when a transmission side determines that line quality is degraded.

[Mode 6]

The wireless communication apparatus described above wherein a Cyclic Redundancy Check (CRC) is used as the first error detection code.

[Mode 7]

The wireless communication apparatus described above further comprising:

a modulation scheme determination circuit that determines, by synthesizing a symbol sequence of a control signal included in a received data and detecting that an error detection code included in the symbol sequence is bit-inverted, that the symbol sequence is transmitted more than once; and a demodulation circuit that demodulates received data using determination result.

[Mode 8]

A second wireless communication apparatus, comprising:

a control signal generation circuit that generates a control signal bit sequence storing modulation scheme information;

a control signal modulation part that generates a control signal symbol sequence by modulating a main signal bit sequence;

a main signal modulation part that generates a main signal symbol sequence by modulating the main signal bit sequence; and a transmission symbol sequence combination circuit that generates a transmission symbol sequence by combining the control signal symbol sequence and the main signal symbol sequence, wherein a wireless communication apparatus on the receiving side is caused to determine the modulation scheme by using the detection result of the error detecting code and select the determined modulation scheme.

[Mode 9]

(Refer to above mentioned data receiving method of the first aspect of the present invention.)

[Mode 10]

The wireless communication apparatus described in Mode 2 wherein the symbol synthesis circuit performs the symbol synthesis per OFDM symbol units.

[Mode 11]

The wireless communication apparatus described in Mode 11 wherein the symbol synthesis circuit performs the symbol synthesis per OFDM symbol units.

[Mode 12]

The wireless communication apparatus described in Mode 2 wherein the symbol synthesis circuit performs the symbol synthesis per reference signal repetition units.

[Mode 13]

The wireless communication apparatus described in Mode 2 wherein the second error detection code is added to a control signal indicating the modulation scheme when a transmission side determines that line quality is degraded.

[Mode 14]

The data receiving method described in Mode 9 wherein a Cyclic Redundancy Check (CRC) is used as the first error detection code.

[Mode 15]

The data receiving method described in Mode 9 wherein the second detection circuit can detect a second error detection code obtained by inverting 2C/K bits assuming that C is a number of bits of the first error detection code and K is a type of modulation scheme to be determined.

[Mode 16]

The data receiving method described in Mode 9, wherein the symbol synthesis circuit performs the symbol synthesis per OFDM symbol units.

[Mode 17]

The data receiving method described in Mode 16, wherein the symbol synthesis circuit performs the symbol synthesis per reference signal repetition units.

[Mode 18]

The data receiving method described in Mode 9, wherein the second error detection code is added to a control signal indicating the modulation scheme when a transmission side determines that line quality is degraded.

[Mode 19]

The data receiving method described in Mode 9, wherein a Cyclic Redundancy Check (CRC) is used as the first error detection code.

[Mode 20]

The data receiving method described in Mode 9, the method further comprising:

determining by synthesizing a symbol sequence of a control signal included in a received data and detecting that an error detection code included in the symbol sequence is bit-inverted, that the symbol sequence is transmitted more than once; and demodulating received data using determination result.

[Mode 21]

The data receiving method described in Mode 9, the method further comprising:

generating a transmission symbol sequence by combining the control signal symbol sequence and the main signal symbol sequence, wherein a wireless communication apparatus on the receiving side is caused to determine the modulation scheme by using the detection result of the error detecting code and select the determined modulation scheme.

REFERENCE SIGNS LIST 101 line quality estimation circuit
102 modulation circuit
103, 104 frequency conversion circuit
105 modulation scheme determination circuit
106 demodulation circuit.
1001 control signal generation circuit
1002 control signal modulation part
1003 main signal modulation part
1004 transmission symbol sequence combination circuit
1101 received symbol sequence selection circuit
1102 control signal demodulation part
1103 main signal modulation scheme detection circuit
1104 main signal demodulation part
1201 bit-inverted CRC generation circuit
1202 error correction code generation circuit
1203 modulation circuit
1204 symbol copy circuit
1301 CRC generation circuit
1302 error correction code generation circuit
1303 modulation circuit
1304 symbol copy circuit
1401 demodulation circuit
1402 error correction circuit
1403 CRC detection circuit
1403a detection circuit
1404 symbol synthesis circuit
1405 demodulation circuit
1406 error correction circuit
1407 bit-inverted CRC detection circuit
1407a second detection circuit
1408 received data selection circuit
1501 demodulation circuit
1502 error correction circuit
1503 CRC detection circuit
1504 double symbol synthesis circuit
1505 demodulation circuit
1506 error correction circuit
1507 bit-inverted CRC detection circuit for double symbol synthesis
1508 quadruple symbol synthesis circuit
1509 demodulation circuit
1510 error correction circuit
1511 bit-inverted CRC detection circuit for quadruple symbol synthesis
1512 received data selection circuit
1601 symbol synthesis circuit
1602 demodulation circuit.
1603 error correction circuit
1604 CRC detection circuit
1701 CRC generation circuit
1702 bit-inversion circuit
1703 CRC selection circuit
1704 bit-combination circuit
1801 CRC generation circuit
1802 bit-inversion value selection circuit
1803 XOR circuit
1804 bit-combination circuit
2001-2004 Fourier transform circuit
2005 symbol synthesis circuit
2006 demodulation circuit
2007 error correction circuit
2008 CRC detection circuit
2101 symbol synthesis circuit
2102 Fourier transform circuit
2103 demodulation circuit
2104 error correction circuit
2105 CRC detection circuit

The invention claimed is:

1. A wireless communication apparatus, comprising:
a symbol synthesis circuit that synthesizes received symbols;
a demodulation circuit that demodulates the received symbols each before and after the synthesis and outputs demodulated received data;
an error correction circuit that corrects the demodulated received data from the demodulation circuit and outputs error corrected received data;
a detection circuit that detects a first error detection code from the error corrected received data;
a second detection circuit that detects a second error detection code obtained by inverting a plurality of arbitrary bits from the error corrected received data; and
a received data selection circuit that
determines a modulation scheme used upon transmission by using detection results of the first and second error detection codes and selects received symbols corresponding to the determined modulation scheme.

2. The wireless communication apparatus according to claim 1, wherein the second detection circuit can detect the second error detection code obtained by inverting 2C/K bits assuming that C is a number of bits of the first error detection code and K is a type of modulation scheme to be determined.

3. The wireless communication apparatus according to claim 2, wherein the symbol synthesis circuit performs the symbol synthesis per Orthogonal Frequency Division Multiplexing (OFDM) symbol units.

4. The wireless communication apparatus according to claim 3, wherein the symbol synthesis circuit performs the symbol synthesis per reference signal repetition units.

5. The wireless communication apparatus according to claim 2 wherein the second error detection code is added to a control signal indicating the modulation scheme when a transmission side determines that line quality degraded.

6. The wireless communication apparatus according to claim 2, wherein a Cyclic Redundancy Check (CRC) is used as the first error detection code.

7. The wireless communication apparatus according to claim 1, wherein the symbol synthesis circuit performs the symbol synthesis per Orthogonal Frequency Division Multiplexing (OFDM) symbol units.

8. The wireless communication apparatus according to claim 7, wherein the symbol synthesis circuit performs the symbol synthesis per reference signal repetition units.

9. The wireless communication apparatus according to claim 1, wherein the second error detection code is added to a control signal indicating the modulation scheme when a transmission side determines that line quality is degraded.

10. The wireless communication apparatus according to claim 1, wherein a Cyclic Redundancy Check (CRC) is used as the first error detection code.

11. The wireless communication apparatus according to claim 1, further comprising:
a modulation scheme determination circuit that determines, by synthesizing a symbol sequence of a control signal included in the received and detecting that an error detection code included in the symbol sequence is bit-inverted, that the symbol sequence is transmitted more than once, wherein
the demodulation circuit demodulates the received symbols using a determination result of the modulation scheme determination circuit.

12. A data receiving method, wherein in a wireless communication apparatus comprising:
synthesizing, by a symbol synthesis circuit, received symbols;
demodulating, by a demodulation circuit, the received symbols each before and after the synthesis and outputting demodulated received data;
correcting, by an error correction circuit, the demodulated received data from the demodulation circuit and outputting error corrected received data;
detecting, by a detection circuit, a first error detection code from the error corrected received data;
detecting, by a second detection circuit, a second error detection code obtained by inverting a plurality of arbitrary bits from the error corrected received data;
determining a modulation scheme used upon transmission by using detection results of the first error detection code and the second error detection code, and
selecting, by a received data selection circuit, the received symbols corresponding to the determined modulation scheme.

13. The data receiving method according to claim 12, wherein the second error detection code is obtained by inverting 2C/K bits assuming that C is a number of bits of the first error detection code and K is a type of modulation scheme to be determined.

14. The data receiving method according to claim 12, wherein the synthesizing the received symbols is performed per Orthogonal Frequency Division Multiplexing (OFDM) symbol units.

15. The data receiving method according to claim 14, wherein the synthesizing the received symbols is performed per reference signal repetition units.

16. The data receiving method according to claim 12 wherein the second error detection code is added to a control signal indicating the modulation scheme when a transmission side determines that line quality is degraded.

17. The data receiving method according to claim 12, wherein a Cyclic Redundancy Check (CRC) is used as the first error detection code.

18. The data receiving method according to claim 12, the method further comprising:
determining, by synthesizing a symbol sequence of a control signal included in the received symbols and detecting that an error detection code included in the symbol sequence is bit-inverted, that the symbol sequence is transmitted more than once; and
performing the demodulating the received symbols based on determining that the symbol sequence is transmitted more than once.

19. The data receiving method according to claim 12, wherein the received symbols comprise a control signal symbol sequence and a main signal symbols sequences, the method further comprising:
generating a transmission symbol sequence by combining the control signal symbol sequence and the main signal symbol sequence,
causing a wireless communication apparatus on the receiving side is caused to determine the modulation scheme based on the first error detecting code, the second error code, and the determined modulation scheme.

* * * * *